(12) United States Patent
Chang et al.

(10) Patent No.: US 8,350,868 B2
(45) Date of Patent: Jan. 8, 2013

(54) METHOD OF COMPOSITING VARIABLE ALPHA FILLS SUPPORTING GROUP OPACITY

(75) Inventors: Albert Chang, Forestville (AU); Bin Liao, Beecroft (AU); Cameron Murray Edwards, Randwick (AU); Scott Bradley, Fife (GB)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 12/898,517

(22) Filed: Oct. 5, 2010

(65) Prior Publication Data

US 2011/0109642 A1    May 12, 2011

(30) Foreign Application Priority Data

Oct. 13, 2009    (AU) ............................... 2009225336

(51) Int. Cl.
    *G09G 5/02*    (2006.01)
(52) U.S. Cl. ........................ 345/592; 345/629
(58) Field of Classification Search ........... 345/592–629
    See application file for complete search history.

(56) References Cited

U.S. PATENT DOCUMENTS

| 5,398,309 | A  | * | 3/1995  | Atkins et al. ................ 345/634 |
| 6,028,583 | A  | * | 2/2000  | Hamburg ..................... 345/629 |
| 6,072,500 | A  | * | 6/2000  | Foran et al. .................. 345/611 |
| 6,480,201 | B1 | * | 11/2002 | Fushiki et al. ............... 345/592 |
| 6,670,955 | B1 |   | 12/2003 | Morein |
| 6,803,923 | B1 | * | 10/2004 | Hamburg ..................... 345/629 |
| 7,046,253 | B2 |   | 5/2006  | Long et al. |
| 7,102,651 | B1 | * | 9/2006  | Louveaux et al. ............ 345/629 |
| 7,136,075 | B1 | * | 11/2006 | Hamburg ..................... 345/592 |
| 7,168,048 | B1 | * | 1/2007  | Goossen et al. .............. 715/797 |

(Continued)

FOREIGN PATENT DOCUMENTS

AU    2005201868    1/2006

OTHER PUBLICATIONS

S. Conversy, et al., "The svgl toolkit: enabling fast rendering of rich 2D graphics", Jun. 2006.

*Primary Examiner* — Nitin Patel
*Assistant Examiner* — Jason Pringle-Parker
(74) *Attorney, Agent, or Firm* — Fitzpatrick, Cella, Harper & Scinto

(57) ABSTRACT

A method of compositing a plurality of graphic objects with a compositing buffer, is disclosed. The plurality of graphic objects forming a group is attenuated by group opacity and is composited from a top object to a bottom object. Based on a first mask and the group opacity, a second mask is generated. The first mask stores a remaining possible contribution for further graphic objects below and including the plurality of graphic objects. The plurality of graphic objects in a top down order is processed. In particular, for each graphic object of the plurality of graphic objects: (a) a contribution value for the graphic object using the second mask is determined, the contribution value representing a contribution of the graphic object to the compositing buffer; (b) a colour value of the graphic object is composited with the compositing buffer using the contribution value; and (c) the second mask is updated using the contribution value. The first mask is then updated using the second mask and the group opacity. The updated first mask is configured for further compositing of objects below the plurality of graphic objects.

10 Claims, 27 Drawing Sheets

U.S. PATENT DOCUMENTS

| | | |
|---|---|---|
| 7,280,120 B2 | 10/2007 | Ecob et al. |
| 2005/0017984 A1 | 1/2005 | Lawther et al. |
| 2005/0017986 A1 | 1/2005 | Anwar et al. ................. 345/629 |
| 2005/0035976 A1 | 2/2005 | Ecob et al. .................... 345/611 |
| 2006/0066637 A1* | 3/2006 | Hamburg ...................... 345/629 |
| 2006/0077210 A1* | 4/2006 | Morris et al. ................. 345/613 |
| 2006/0103671 A1* | 5/2006 | Brown .......................... 345/629 |
| 2007/0126753 A1* | 6/2007 | Moore et al. .................. 345/592 |
| 2008/0094411 A1* | 4/2008 | Parenteau et al. ............. 345/592 |
| 2009/0267959 A1* | 10/2009 | Gonion ......................... 345/592 |

\* cited by examiner

METHOD OF COMPOSITING VARIABLE ALPHA FILLS SUPPORTING GROUP OPACITY

REFERENCE TO RELATED PATENT APPLICATION(S)

This application claims the benefit under 35 U.S.C. §119 of the filing date of Australian Patent Application No. 2009225336, filed 13 Oct. 2009, hereby incorporated by reference in its entirety as if fully set forth herein.

TECHNICAL FIELD OF INVENTION

The current invention relates to the field of computer graphics and compositing of two-dimensional (2D) graphic objects and, in particular, to the application of group opacity to one or more graphic objects in a rendering system. The current invention is particularly advantageous for use with those rendering systems in which processing resources are limited. The current invention also relates to a method and apparatus for compositing a graphic object with a compositing buffer, and to a computer program product including a computer readable medium having recorded thereon a computer program for a graphic object with a compositing buffer.

DESCRIPTION OF BACKGROUND ART

The problem of compositing graphic objects using limited processing resources is known within the field of computer graphics. Performing complex compositing operations on an embedded device (such as a mobile phone, portable media player or digital camera) requires expensive central processing unit (CPU) and memory hardware resources. Equipping embedded devices with such hardware increases overall device cost. Furthermore, performing complex compositing operations reduces battery life in portable devices. In the past, these difficulties have prohibited the use of complex compositing operations on embedded devices. Consequently, embedded device graphical user-interfaces tend to be unappealing in nature and generally lacking complex compositing. By contrast, performing complex compositing operations on computer devices with comparatively unlimited resources (eg. notebook and desktop computers) is commonplace.

As embedded devices become more feature rich, there is a clear need for higher quality graphical user interfaces. Improving aesthetic quality and responsiveness of a graphical user interface improves the overall usability and user experience that such a device offers.

Applying a single opacity to a group of graphic objects is a compositing feature that user interface (UI) designers desire for use in an embedded device user interface. This feature has long been possible in desktop personal computer (PC) user interfaces. However, when using existing methods, providing this feature in embedded devices is cost prohibitive.

One conventional method of applying group opacity involves recursively compositing grouped graphic objects. Such a method composites each group of graphic objects into a separate compositing buffer. Essentially, this method "flattens" grouped graphic objects so that each group can be processed as if the group were a single graphic object. The disadvantage of this method is that an extra compositing buffer is required for each group of graphic objects. Furthermore, using this method requires extra processing, because the result of each flattened group must be composited with other graphic objects.

Another conventional method of applying group opacity involves determining intersection regions of overlapping graphic objects, and decomposing the graphic objects into fragment graphic objects such that an opacity value can be applied to each fragment graphic object to produce a correct result. This method requires much pre-processing of graphic object data to determine intersection regions. Furthermore, this method does not support graphic objects having a variable opacity.

Still another conventional method of applying group opacity relies on removal of background graphic objects from a partial compositing result. After background objects have been removed, group opacity may be applied. Following application of the group opacity, the result is re-combined with background graphic objects. Such a method requires allocation of additional buffers and much copying between buffers.

SUMMARY OF THE INVENTION

It is an object of the present invention to substantially overcome, or at least ameliorate, one or more disadvantages of existing arrangements.

According to one aspect of the present invention there is provided a method of compositing a plurality of graphic objects with a compositing buffer, said plurality of graphic objects forming a group being attenuated by group opacity and being composited from a top object to a bottom object, the method comprising the steps of:

generating, based on a first mask and the group opacity, a second mask, the first mask storing a remaining possible contribution for further graphic objects below and including said plurality of graphic objects;

processing said plurality of graphic objects in a top down order, the processing comprising the sub-steps of, for each graphic object of the plurality of graphic objects:
  (a) determining a contribution value for the graphic object using the second mask, the contribution value representing a contribution of the graphic object to the compositing buffer;
  (b) compositing a colour value of the graphic object with the compositing buffer using said contribution value; and
  (c) updating the second mask using said contribution value; and
updating the first mask using said second mask and the group opacity, wherein said updated first mask is configured for further compositing of objects below said plurality of graphic objects.

According to another aspect of the present invention there is provided an apparatus for compositing a plurality of graphic objects with a compositing buffer, said plurality of graphic objects forming a group being attenuated by group opacity and being composited from a top object to a bottom object, the apparatus comprising:

means for generating, based on a first mask and the group opacity, a second mask, the first mask storing a remaining possible contribution for further graphic objects below and including said plurality of graphic objects;

means for processing said plurality of graphic objects in a top down order, the processing comprising the steps of, for each graphic object of the plurality of graphic objects:
  (a) determining a contribution value for the graphic object using the second mask, the contribution value representing a contribution of the graphic object to the compositing buffer;

(b) compositing a colour value of the graphic object with the compositing buffer using said contribution value; and (c) updating the second mask using said contribution value; and means for updating the first mask using said second mask and the group opacity, wherein said updated first mask is configured for further compositing of objects below said plurality of graphic objects.

According to still another aspect of the present invention there is provided a system for compositing a plurality of graphic objects with a compositing buffer, said plurality of graphic objects forming a group being attenuated by group opacity and being composited from a top object to a bottom object, the system comprising:

a memory for storing data and a computer program; and a processor coupled to said memory for executing said computer program, said computer program comprising instructions for:

generating, based on a first mask and the group opacity, a second mask, the first mask storing a remaining possible contribution for further graphic objects below and including said plurality of graphic objects;

processing said plurality of graphic objects in a top down order, the processing comprising the sub-steps of, for each graphic object of the plurality of graphic objects:

(a) determining a contribution value for the graphic object using the second mask, the contribution value representing a contribution of the graphic object to the compositing buffer;

(b) compositing a colour value of the graphic object with the compositing buffer using said contribution value; and (c) updating the second mask using said contribution value; and updating the first mask using said second mask and the group opacity, wherein said updated first mask is configured for further compositing of objects below said plurality of graphic objects.

According to still another aspect of the present invention there is provided a computer readable medium having recorded thereon a computer program for compositing a plurality of graphic objects with a compositing buffer, said plurality of graphic objects forming a group being attenuated by group opacity and being composited from a top object to a bottom object, the program comprising:

code for generating, based on a first mask and the group opacity, a second mask, the first mask storing a remaining possible contribution for further graphic objects below and including said plurality of graphic objects;

code for processing said plurality of graphic objects in a top down order, the processing comprising the steps of, for each graphic object of the plurality of graphic objects:

(a) determining a contribution value for the graphic object using the second mask, the contribution value representing a contribution of the graphic object to the compositing buffer;

(b) compositing a colour value of the graphic object with the compositing buffer using said contribution value; and (c) updating the second mask using said contribution value; and code for updating the first mask using said second mask and the group opacity, wherein said updated first mask is configured for further compositing of objects below said plurality of graphic objects.

Other aspects of the invention are also disclosed.

BRIEF DESCRIPTION OF THE DRAWINGS

At least one embodiment of the present invention will now be described with reference to the following drawings, in which.

DETAILED DESCRIPTION OF EMBODIMENTS OF THE INVENTION

Figure 14:
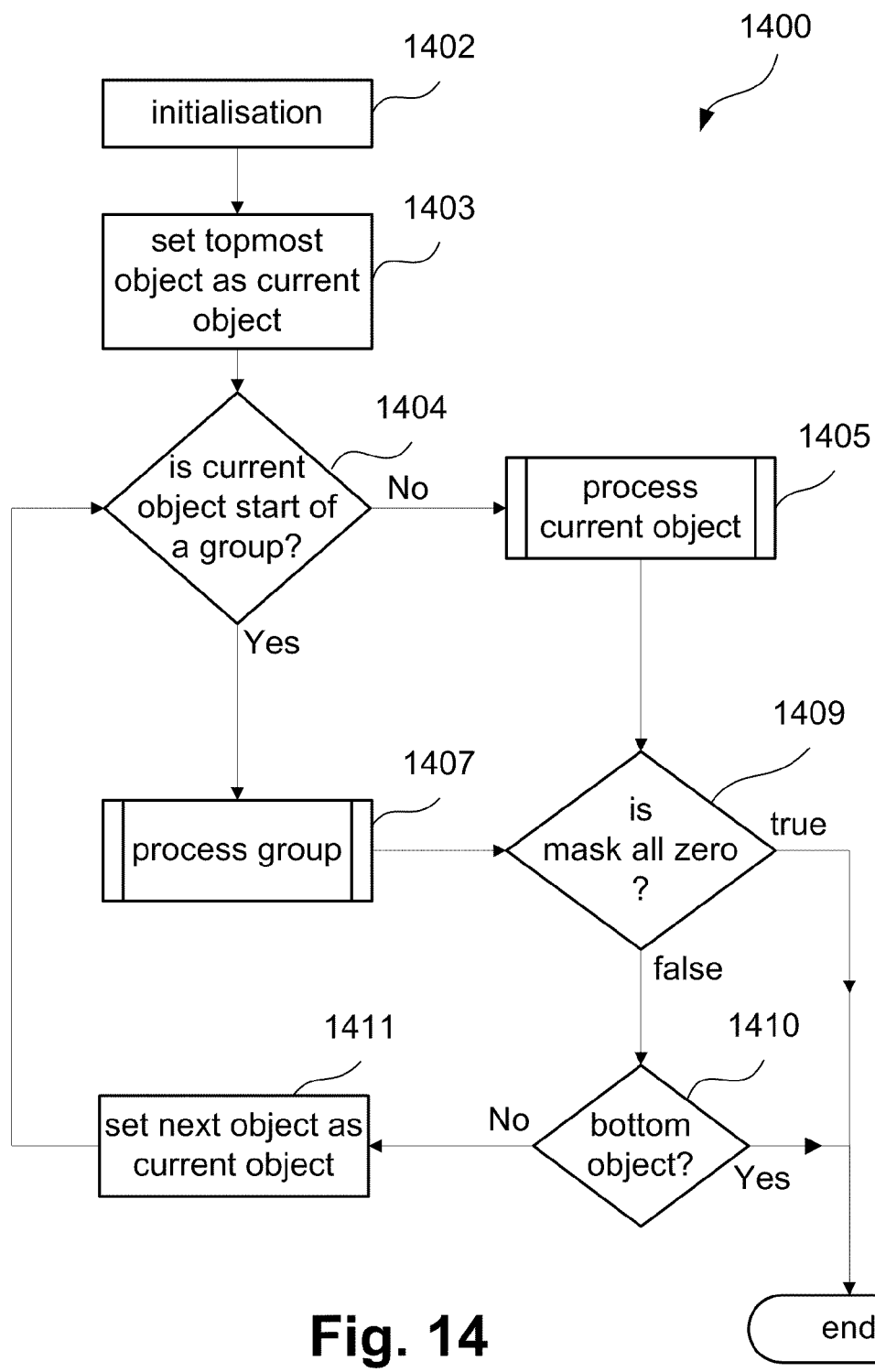
FIG. 14 is a flow diagram showing a method of compositing variable opacity objects.

A method 1400 of compositing filled graphic objects including graphic objects filled using a variable opacity fill, will be described below with reference to FIG. 14. The method 1400 may be referred to as a "compositing process". One or more of the graphic objects are attenuated by group opacity. As described below, the contribution of a graphic object is determined by multiplying RGB (red, green, blue) values of the graphic object's fill by corresponding alpha values and by a mask (i.e., a set of values including one value for each pixel). The mask incorporates the remaining possible contribution for graphic objects below and the effect of any group opacity including the group opacity that is nested. The remaining contribution represents a contribution of red, green, blue and alpha channels when used in an RGB colour space. The mask is updated as graphic objects are processed down a list of active graphic objects.

Figure 1A:
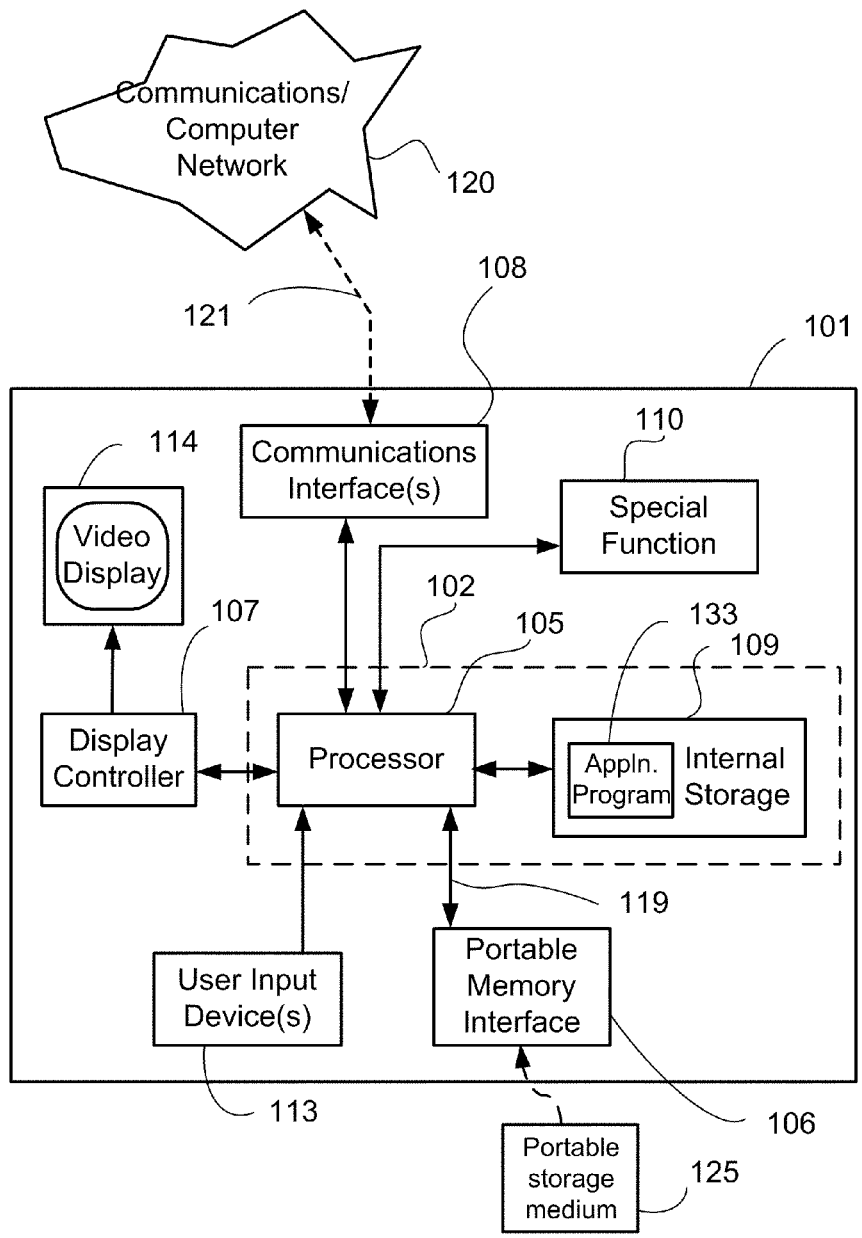
FIGS. 1A and 1B collectively form a schematic block diagram representation of an electronic device upon which described arrangements can be practised.
Figure 1B:
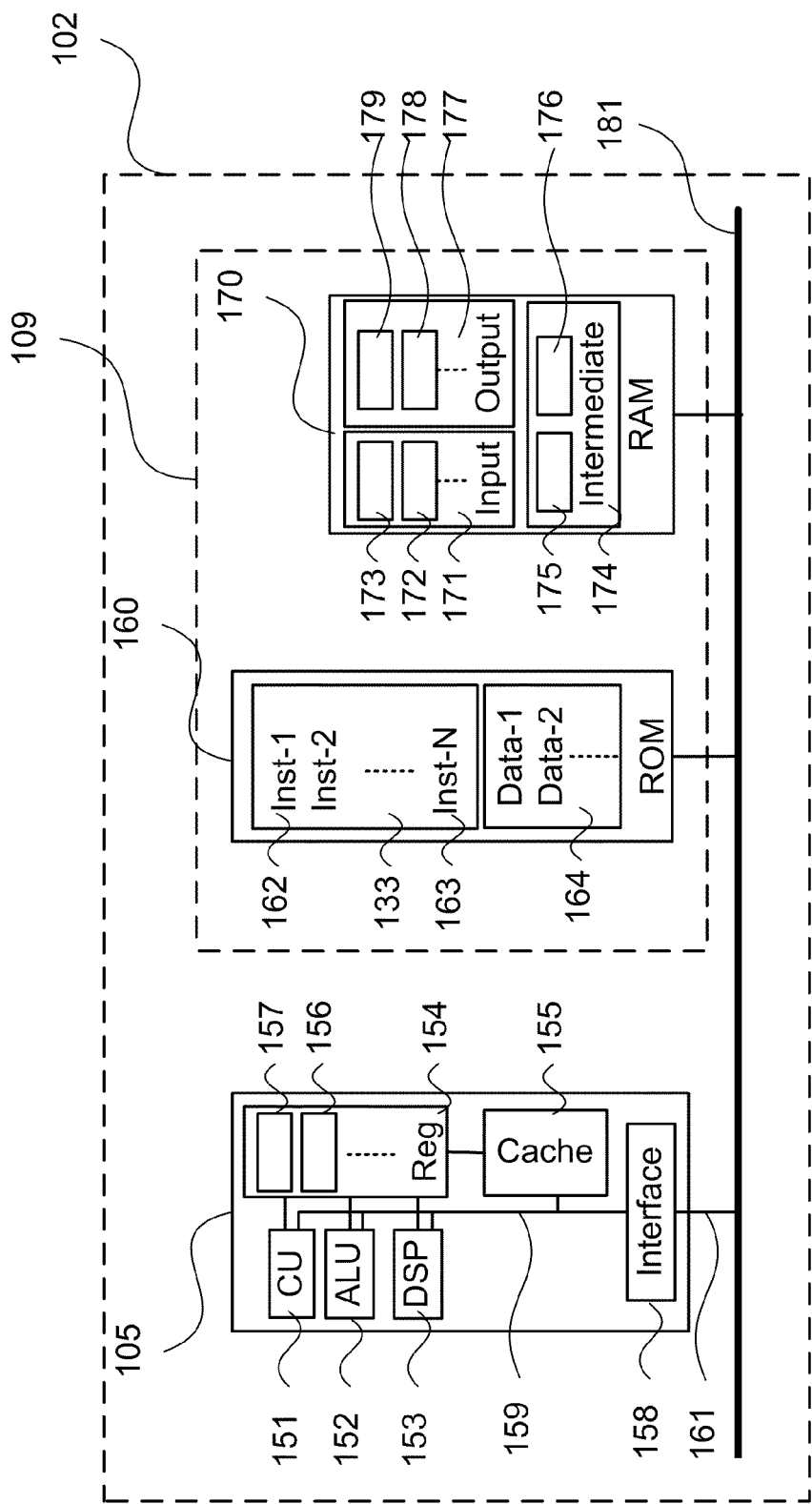

FIGS. 1A and 1B collectively form a schematic block diagram of a general purpose electronic device 101 comprising embedded components, upon which the compositing methods to be described are desirably practiced. The electronic device 101 may be, for example, a mobile phone, a portable media player or a digital camera, in which processing resources are limited. Nevertheless, the methods to be described may also be performed on higher-level devices such as desktop computers, server computers, and other such devices with significantly larger processing resources. As seen in FIG. 1A, the electronic device 101 comprises an embedded controller 102. Accordingly, the electronic device 101 may be referred to as an "embedded device." In the present example, the controller 102 comprises a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The electronic device 101 comprises a display controller 107, which is connected to a video display 114, such as a liquid crystal display (LCD) panel or the like. The display controller 107 is configured for displaying graphical images on the video display 114 in accordance with instructions received from the processor 105.

The electronic device 101 also comprises user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the electronic device 101 also comprises a portable memory interface 106, which is coupled to the processor 105 via a connection 119. The portable memory interface 106 allows a complementary portable memory device 125 to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 101 also comprises a communications interface 108 to permit coupling of the device 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 101 is configured to perform some special function. The embedded controller 102, possibly in conjunction with further special function components 110, is provided to perform that special function. For example, where the device 101 is a digital camera, the components 110 may represent a lens, focus control and image sensor of the camera. As another example, the device 101 may be a mobile telephone handset. In this instance, the components 110 may represent those components required for communications in a cellular telephone environment. Where the device 101 is a portable device, the special function components 110 may represent a number of encoders and decoders of a type including Joint Photographic Experts Group (JPEG), (Moving Picture Experts Group) MPEG, MPEG-1 Audio Layer 3 (MP3), and the like.

The methods described below may be implemented using the embedded controller 102 wherein the processes of FIGS. 2 to 18, to be described, may be implemented as one or more software application programs 133 executable within the embedded controller 102. The electronic device 101 is an effective and advantageous apparatus for implementing the described methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 is generally loaded into the controller 102 from a computer readable medium, and is then typically stored in the ROM 160 of the internal storage module 109, as illustrated in FIG. 1A, after which the software 133 can be executed by the processor 105. In some instances, the processor 105 may execute software instructions that are located in RAM 170. Software instructions may be located in RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

As described herein, the application program 133 is typically pre-installed and stored in the ROM 160 by a manufacturer, prior to distribution of the electronic device 101. However, in some instances, the application programs 133 may be supplied to the user encoded on one or more CD-ROM (not shown) and read via the portable memory interface 106 prior to storage in the internal storage module 109 or in the portable memory 125. In another alternative, the software application program 133 may be read by the processor 105 from the network 120 or loaded into the controller 102 or the portable storage medium 125 from other computer readable media. Computer readable storage media refers to any storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B is a detailed schematic block diagram of the controller 102 comprising the processor 105 for executing the application programs 133, and the internal storage 109. The internal storage 109 comprises read only memory (ROM) 160 and random access memory (RAM) 170. The processor 105 is able to execute the application programs 133 stored in one or both of the connected memories 160 and 170. When the electronic device 102 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 though 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101. Typically, the application program 133 will wait for events and subsequently execute the block of code associated with that event. Events may be triggered in response to input from a user, via the user input devices 113, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the electronic device 101.

In a graphics rendering system, rendering of graphic objects produces pixel values in a frame buffer suitable for display on a display device such as a liquid crystal display (LCD) screen. In a simple rendering system, each graphic object is rasterised, in order from bottom-most graphic object to top-most graphic object. The bottom-most graphic object may be obscured by any of the graphic objects above the bottom-most graphic object. Such a rendering system is known as a painter's algorithm renderer. Rendering in such a way is efficient in terms of memory usage and processing, even in the presence of opacity being applied to individual graphic objects. In rendering systems, colour and opacity can be represented in various ways.

The red/green/blue (RGB) pixel format is the most common format to encode colour information. The colour is expressed as an RGB triplet (r,g,b), each colour component of which can vary from zero to a defined maximum value. The value of the r colour component represents intensity of red, the value of the g colour component represents the intensity of green and the value of the b colour component represents the intensity of blue. If all three colour components are zero the result is black. If all three colour components are at maximum, the result is a brightest representable white.

The red/green/blue/alpha (RGBA) pixel format is a variant of the RGB pixel format which includes a component for opacity. The opacity component is commonly known as the alpha channel, so the format is named RGBA. RGBA is a representation that integrates opacity information along with colour information. An RGBA pixel value may be expressed in the form (r, g, b, a). The alpha channel allows for alpha blending of one image over another. If the alpha value is zero the result is fully transparent; if the alpha value is at maximum, the result is fully opaque.

The ranges for the r, g, b and a components may be quantified in several different ways, as follows:

(i) as fractional values between 0.0 and 1.0 inclusive. This representation is used in systems that use floating-point representations;

(ii) as percentages from 0% to 100%;

(iii) as integer numbers in the range zero (0) to two hundred and fifty five (255), the range that a single 8-bit byte can offer (by encoding 256 distinct values); or (iv) as integer numbers in the range zero (0) to sixty-five thousand five hundred and thirty-five (65535), the range that sixteen (16) bits can offer, as is common in high end digital imaging equipment.

Another pixel format referred to as the RGBA8888 pixel format, consists of four (4) component values of eight (8) bits each. This means that the RGBA8888 pixel format consumes a total of thirty-two (32) bits per pixel (BITS_PER_PIXEL) which is equivalent to four (4) bytes per pixel (BYTES_PER_PIXEL).

When determining the pixel values of the frame buffer, each graphic object intersecting some point on the display screen is considered. Moreover, for a given point on the display screen corresponding to a display pixel, any graphic object intersecting the point may have some colour value contributing to the display pixel value. The process of determining a resulting display pixel value based on intersecting graphic objects is known as compositing.

When compositing graphic objects that are completely opaque (i.e., each graphic object's opacity is 100%), a topmost intersecting graphic object will have a 100% contribution to a resulting display pixel value. That is, the resulting display pixel value will be equal to the colour value of the top-most intersecting graphic object. Moreover, any intersecting graphic object below the top-most graphic object will have no contribution (i.e., each graphic object below the top-most will have 0% contribution) to the resulting display pixel value.

When compositing graphic objects that may have an opacity between 0% and 100%, the colours of graphic objects need to be blended using compositing operations. Such a blending process is referred to as alpha compositing.

Consider a painter's algorithm renderer that composites graphic objects into a compositing buffer B. Before any graphic objects are composited into the compositing buffer, the compositing buffer colour component (B.colour) is initialised to 0%. Now consider a graphic object O with colour component O.colour and opacity O.opacity. The graphic object O can be alpha composited into (i.e. on top of) the compositing buffer using the Equation (1) as follows:

$$B.colour_{final} = O.colour*O.opacity + (100\% - O.opacity)*B.colour_{initial} \quad (1)$$

Equation (1) is known as the OVER compositing operator. If the compositing buffer needs to be alpha composited over other graphic objects, then a compositing buffer opacity component (B.opacity) for each pixel may be stored in the compositing buffer. Before any graphic objects are composited into the compositing buffer, the compositing buffer opacity component (B.opacity) is initialised to 0%. When a graphic object O is alpha composited into the compositing buffer, the compositing buffer opacity component (B.opacity) is determined using the Equation (2), as follows:

$$B.opacity_{final} = O.opacity + (100\% - O.opacity)*B.opacity_{initial} \quad (2)$$

Equation (2) is referred to as the OVER compositing operator for the alpha channel.

After applying the OVER compositing operator (i.e., Equations (1) and (2)), the effect of the opacity component (B.opacity) has already been applied to the resulting colour component (B.colour). Such a colour value is described as B.colour having been pre-multiplied by B.opacity.

A graphic object P that has been pre-multiplied by an associated alpha channel can be alpha composited into (i.e. on top of) an initialised compositing buffer B using Equation (3) as follows:

$$B.colour_{final} = P.colour + (100\% - P.opacity)*B.colour_{initial} \quad (3)$$

The effect of using pre-multiplied graphic objects does not affect alpha channel calculations. That is, the opacity component (B.opacity) is determined using the OVER compositing operator for alpha channel calculations (i.e., Equation (2)).

A subset of graphic objects may be composited as a group and then an additional opacity may be applied to the result of compositing the group. Such an additional opacity is referred to as a group opacity. An additional render buffer, which will be referred to as the group buffer ($GB_{initial}$), may be used for applying the group opacity. The additional render buffer method renders the subset of graphic objects into the group buffer in isolation from the final display buffer. Once the subset of graphic objects has been rendered into the group buffer ($GB_{initial}$), the group opacity associated with the group is en applied to the group buffer. The following expressions may be used determine a result ($GB_{fi}$ of applying group opacity GO to a group buffer ($GB_{initial}$) in accordance with Equations (4) and (5) below:

$$GB.colour_{final} = GO*GB.colour_{initial} \quad (4)$$

$$GB.opacity_{final} = GO*GB.opacity_{initial} \quad (5)$$

The group buffer is then used in place of the subset of graphic objects, producing what may be referred to as the group graphic object. The group graphic object has been pre-multiplied by a corresponding alpha channel. The group graphic object is then composited with the remaining graphic objects into the final display buffer. Such a method uses additional memory and introduces additional calculations associated with compositing the group graphic object with remaining graphic objects. The methods described below replicate the effect of applying group opacity using the method described above, while minimising resource costs normally associated with applying such an effect.

The application of group opacity to a graphic object may be used to hide part or all of a graphic object. This may be achieved by using a zero (0) group opacity value, which will result in grouped graphic objects being invisible. Such an effect, which results in graphic objects being invisible, may be described as a clipping effect.

When rendering graphic objects, some graphics rendering systems composite graphic objects in a top-down order. Such a graphics rendering system is sometimes described as a reverse painter's algorithm renderer.

The described methods composite a number of bitmap image graphic objects. Bitmap image graphic objects may be composited using the OVER compositing operator as described above. Additionally, a subset of bitmap image graphic objects may be grouped, so as to apply group opacity. The described methods permit nested grouping, such that the graphic objects in one group are a subset of the graphic objects of a parent group.

In accordance with the described methods, a number of bitmap image graphic objects may be provided to the processor 105 for compositing and rendering to a frame buffer configured within RAM 170. Bitmap image graphic objects may have various pixel formats. Two such formats are RGB and RGBA as described above.

A bitmap image may have a varying opacity across the image. Such an image is described as having variable alpha. A bitmap image may have the same opacity for all pixels. Such an image is described as having constant alpha. A bitmap image may have the same colour for all pixels. Such an image is described as having a constant colour. A bitmap image may have all pixels fully opaque. Such an image is described as being fully opaque. As described herein, flags may be used to distinguish the different types of images (i.e., variable alpha, constant alpha, constant colour and fully opaque) described above. The flags may be used during the compositing process to perform various optimisations, such as using simple compositing for constant colour bitmap or for a quick determination of fully opaque resulting image, etc.

While the described methods accept bitmap image graphic objects, it will be appreciated that other types of graphic objects may be used. For example, the described methods may be applied to vector graphic objects, run length encoded graphic objects, linear blended graphic objects, etc.

The described methods render graphic objects by creating a rasterised representation of the graphic objects referred to as a frame. Rendering of a frame is broken into two processes; firstly a frame setup process, followed by a frame render process.

The frame setup process involves receiving a description of graphic objects that are to be rendered. Additionally, the frame setup process involves receiving a description of graphic objects to be grouped, so as to allow the application of group opacity. During the frame setup process, the combined description of all graphic objects and groups of graphic objects is referred to as the frame description. The frame description is constructed by calls to an Application Programming Interface (API).

When setting up a frame, iterative calls to an API specify bitmap images to be placed in the frame to be rendered. Each time a bitmap is placed using the API, a bitmap data structure may be added to a list of all bitmap data structures for the frame configured within the RAM 170. This list of bitmaps may be referred to as the bitmaps list. The bitmaps list is part of the frame description, and is initialised to be an empty list before the user adds any bitmap images to the frame description.

In addition to bitmap images, iterative calls to an API are used to specify groups of graphic objects, which allow group opacity to be applied. Each time a group is defined using the API, a group data structure may be added to a list of all group data structures for the frame. This list of groups is referred to as the groups list. The groups list is part of the frame description, and is initialised to be an empty list before the user adds groups to the frame description.

After bitmaps and groups have been added to the frame description, the frame may be rendered using a call to the API.

Figure 3:
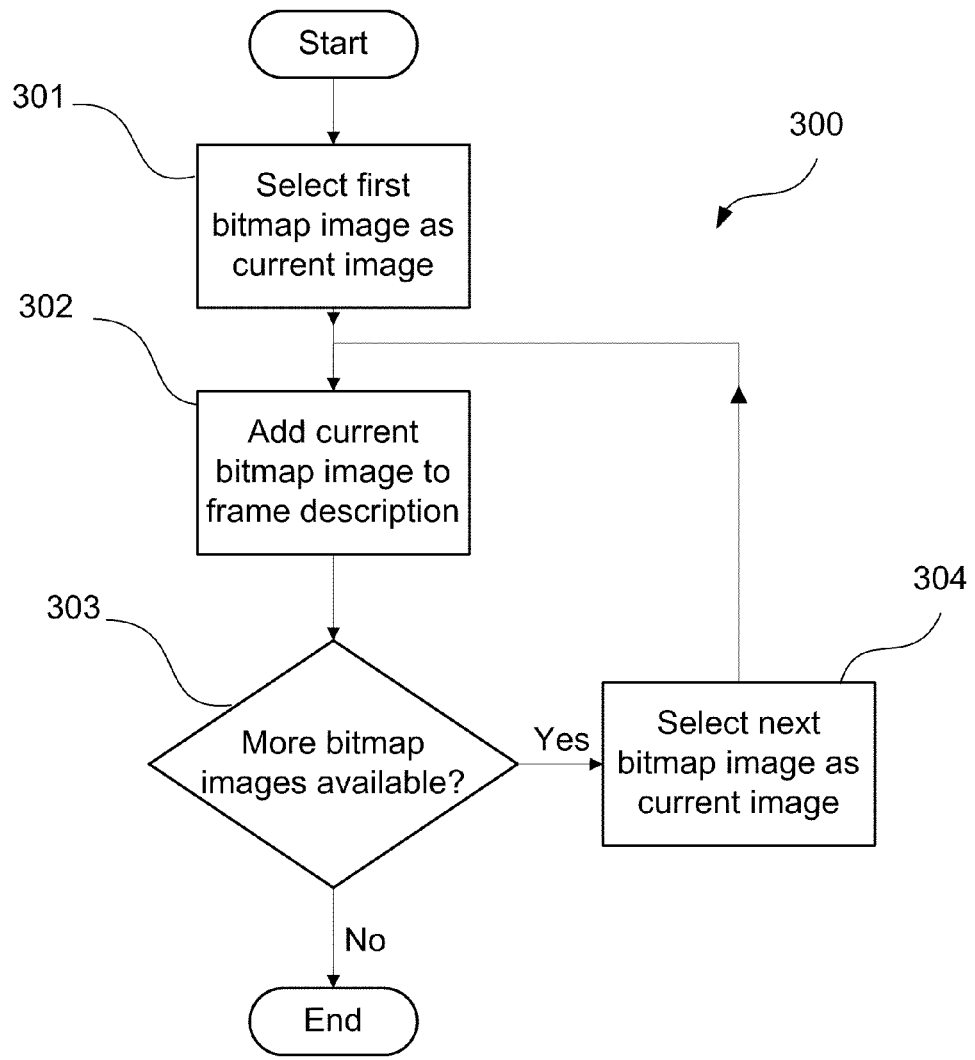
FIG. 3 is a flow diagram showing a method of adding bitmap images into a frame.

FIG. 3 is a flow diagram showing a method 300 of adding bitmap images into a frame. The method 300 may be implemented as one or more code modules of the application program 133 resident in ROM 160 and being controlled in its execution by the processor 105.

The method 300 begins at step 301, where an API function is called by the processor 105 to select a first bitmap image as the current image. Then in step 302, an API function is called by the processor 105 to add the current bitmap image graphic object to a frame description configured within the RAM 170. A method 400 of adding the bitmap image to the frame description will be described in detail below with reference to FIG. 4. In step 303, if the processor 105 determines that there are additional bitmap images to be added, then the method 300 proceeds to step 304, where the next bitmap image is selected by the processor 105 to be the current image. Then in step 302, the image selected in step 304 is added to the frame description configured within the RAM 170. Steps 302, 303 and 304 repeat until all bitmap images have been added to the frame description.

The method 400 of adding a bitmap image to the frame description, as executed at step 302, will now be further described with reference to FIG. 4. The method 400 may be implemented as one or more code modules of the application program 133 resident in ROM 160 and being controlled in its execution by the processor 105.

Figure 4:
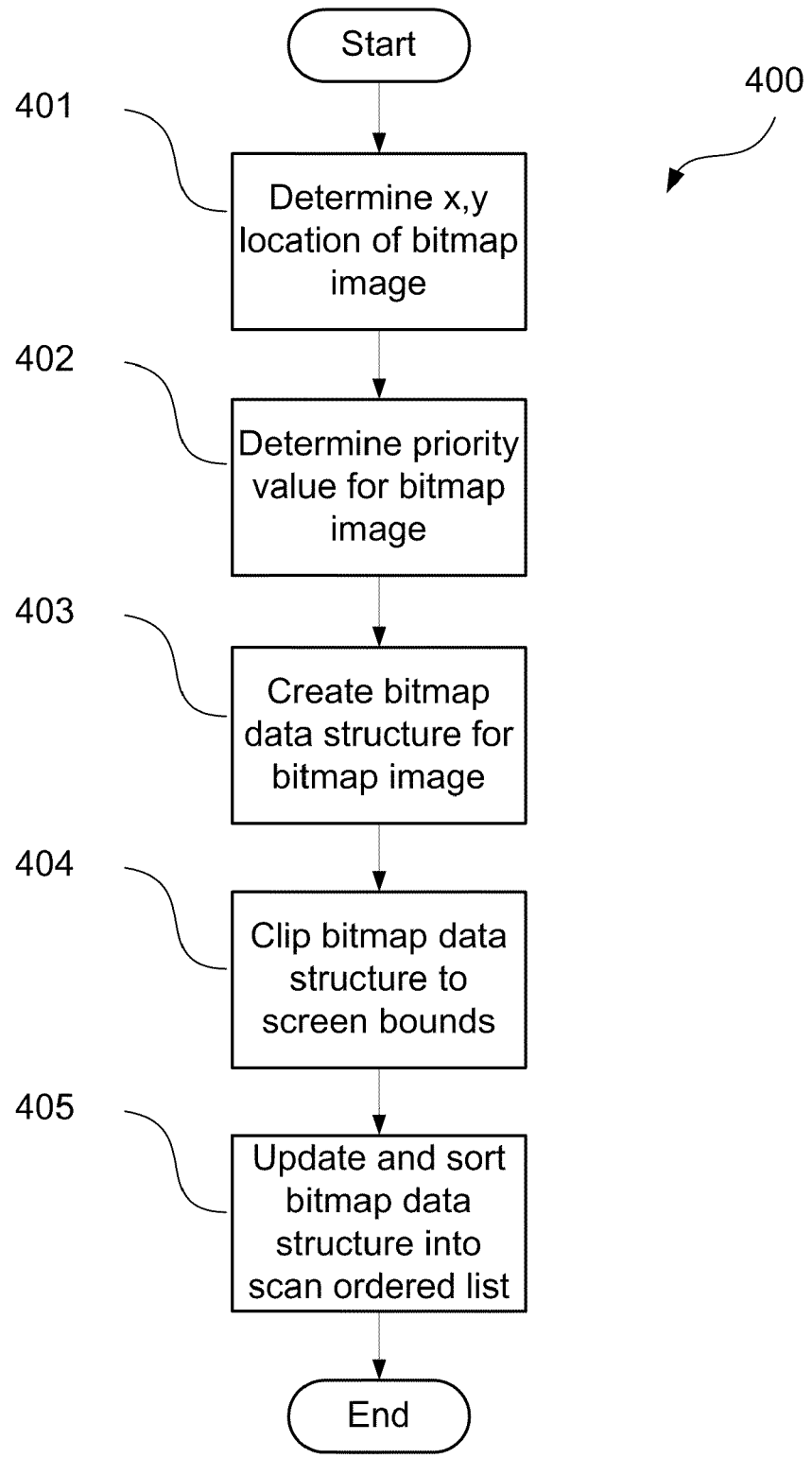
FIG. 4 is a flow diagram showing a method of adding a bitmap image into a frame description.

Referring to FIG. 4, the method 400 begins at step 401, where the position of the bitmap image is determined by the processor 105 using (x, y) screen pixel co-ordinates. Step 401 will be described in further detail below. At step 402, the processor 105 determines a priority value for the bitmap image. This priority value affects the compositing order of graphic objects. Step 402 will be described in further detail below.

In step 403, the processor 105 creates a bitmap data structure in the RAM 170 for the bitmap image being added to the frame description. In step 404, the bitmap data structure is passed to a clipping operation by the processor 105 which either discards the bitmap data structure or clips the bitmap data structure so that the data structure lies completely within bounds of a screen displayed on the display device 114. A method 500 of discarding and clipping an image, as executed at step 404, will be described below with reference to FIG. 5.

In step 405, the processor 105 updates the bitmap data structure and sorts the bitmap data structure into a list of all bitmap data structures in the order required by the compositing process 1400

At step 401, the position of the bitmap image is determined by specifying the screen pixel column and row for positioning the top-left corner of the bitmap image. The screen pixel column and row are specified using an (x, y) screen pixel co-ordinate system. A value of (0, 0) indicates a position at the top-left corner of the screen displayed on the display device 114. A value of (SCR_WIDTH, SCR_HEIGHT) indicates a position at the bottom-right of the screen, where the values SCR_WIDTH and SCR_HEIGHT represent the actual values of the screen width and screen height, in pixels, respectively. A bitmap image may be positioned within the bounds of the screen displayed on the display device 114, overlapping the screen bounds or completely outside the screen bounds.

Figure 2:
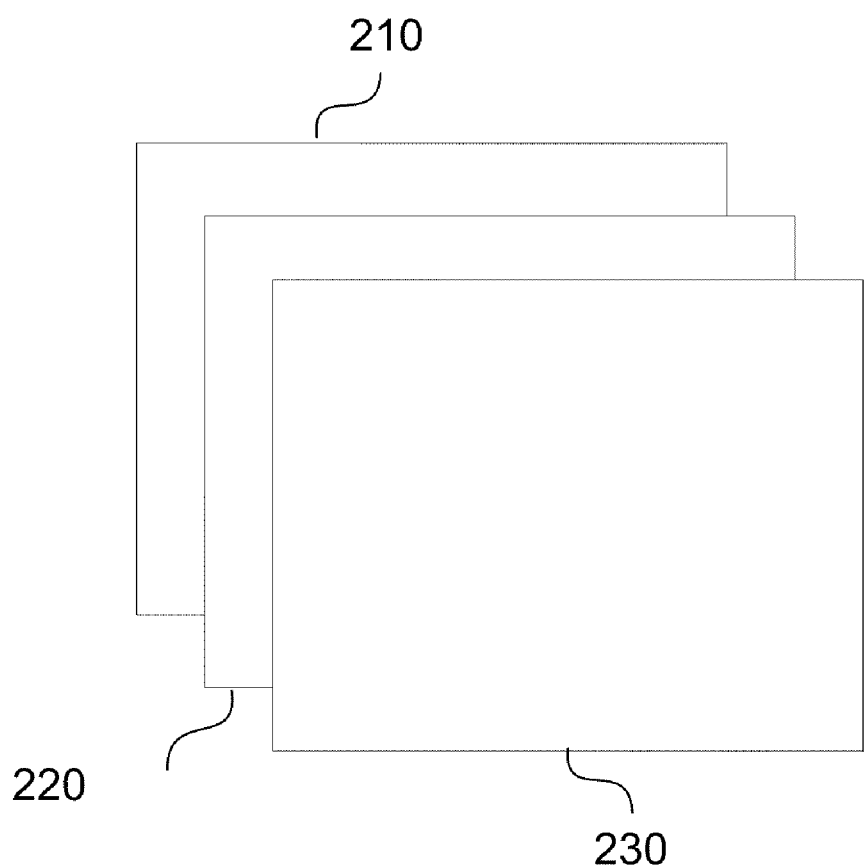
FIG. 2 shows the relationship between rendering order and priority.

As described above, at step 402, the processor 105 determines a priority value for the bitmap image. The priority value associated with the bitmap image of a graphic object provides information indicating the compositing order of the graphic object, relative to all other graphic objects placed into the frame description for rendering. FIG. 2 shows the relationship between rendering order and priority. As seen in FIG. 2, graphic objects 210, 220 and 230 are associated with priority values one (1), two (2), and three (3) respectively. The object 210 has a priority value of one (1) in the frame description and is rendered closest to a background. As shown in FIG. 2, graphic object 210 is obscured by graphic objects 220 and 230, since the graphic object 210 has the lowest priority value (i.e., one (1)) of the three graphic objects 220 and 230 in the frame. The graphic object 230 has a priority value of three (3), which is the highest priority value in the frame description and therefore is rendered the furthest from the background. As seen in FIG. 2, graphic object 230 obscures all other graphic objects, because graphic object 230 has the highest priority value of the three graphic objects in the frame. When the graphic objects are processed using a top-down renderer, graphic objects with a higher priority value are processed before graphic objects with lower priority value.

Figure 7:
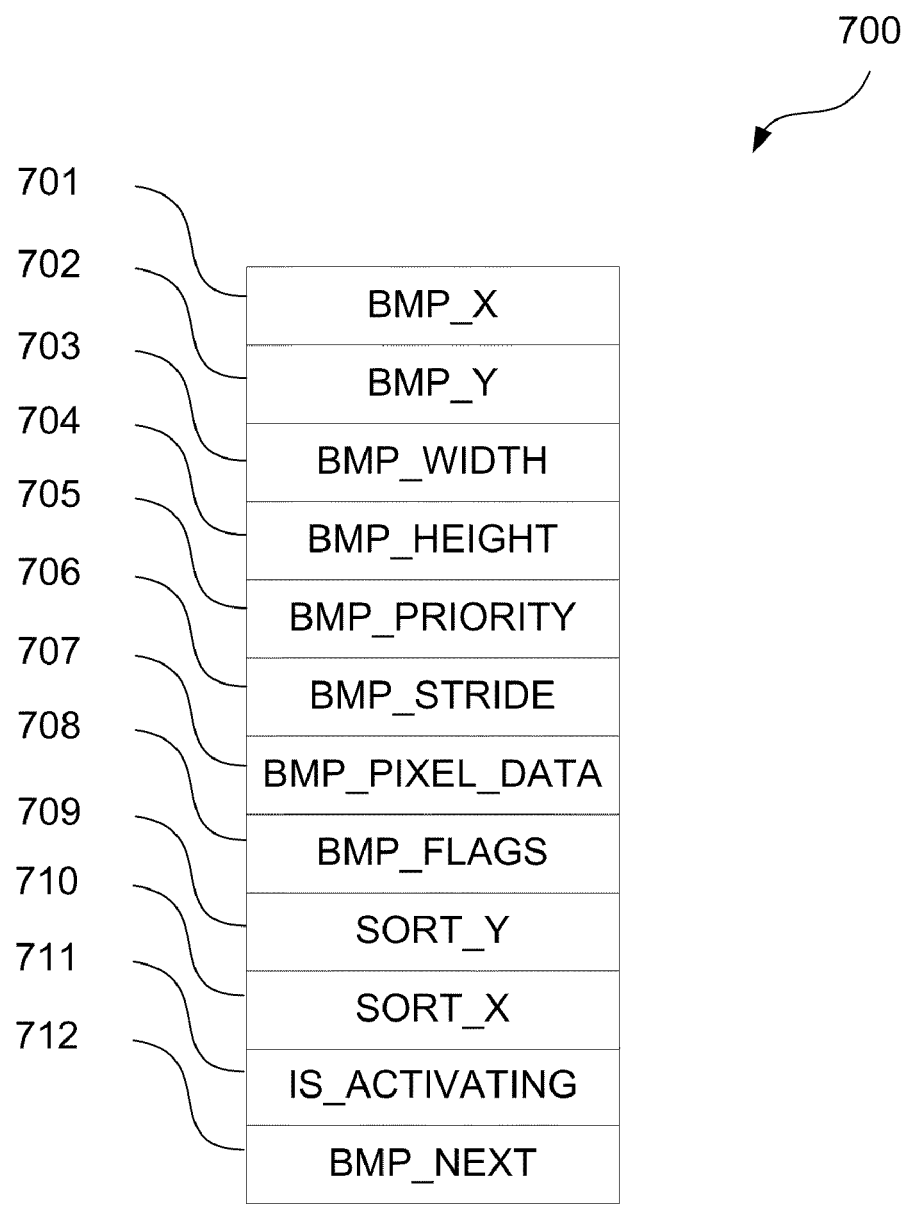
FIG. 7 is a diagram showing the fields of a bitmap data structure.
Figure 8:
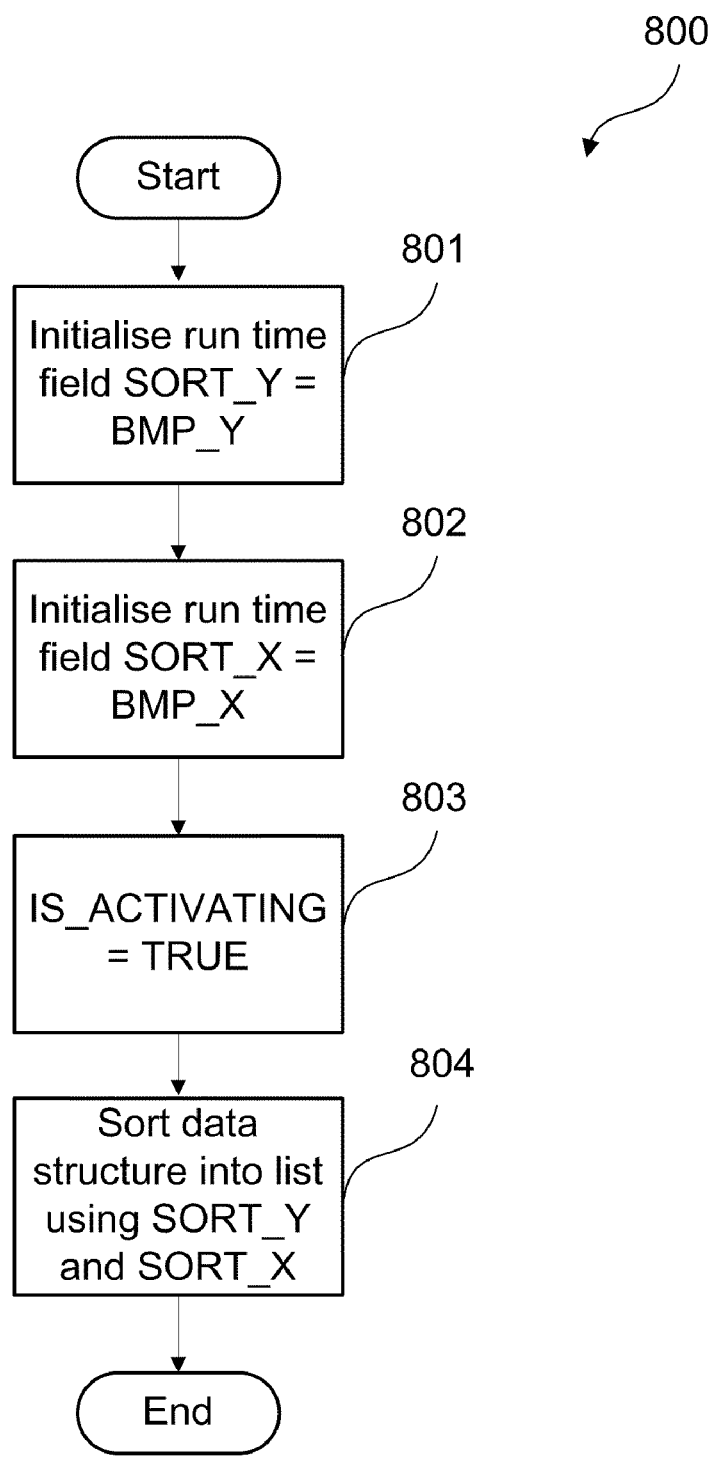
FIG. 8 is a flow diagram showing a method of updating and sorting a bitmap data structure.

As described above, in step 403, a bitmap data structure is created. FIG. 7 shows fields in an exemplary bitmap data structure. The bitmap data structure includes the following fields:

BMP_X field 701, representing the starting column of the image,
BMP_Y field 702, representing the starting row of the image,
BMP_WIDTH field 703, representing the bitmap image width in pixels,
BMP_HEIGHT field 704, representing the bitmap image height in pixels,
BMP_PRIORITY field 705, representing the priority value of the bitmap,
BMP_STRIDE field 706, representing a value specifying the number of bytes used for each row of the bitmap, and,
BMP_PIXEL_DATA field 707, representing which is used to reference the actual bitmap pixel data.
BMP_FLAGS field 708, representing a set of flags, which contains a bitwise OR of flag values indicating if the bitmap image has variable alpha, constant alpha, constant colour or is fully opaque.

Each of the fields 701-708 is initialised at step 403 of the method 400. In addition to the above listed fields 701-708, the bitmap data structure contains fields 709-712 which are used and modified by the processor 105. The additional fields include SORT_X 710, SORT_Y 709, the IS_ACTIVATING flag 711 and the BMP_NEXT pointer 712. The usage of the fields 701-712 is described in more detail below.

As described above, in step 404, the bitmap image is either discarded or clipped to the screen bounds. Step 404 optimises the frame description, whereby an image displayed outside of the screen bounds is discarded. If the image is not discarded, then the image either lies entirely inside the screen bounds or partially within the screen bounds. If the image lies partially within the screen bounds, then the image is clipped so that the image lies entirely within the screen bounds. The rendering of the frame is performed by the processor 105 based on the assumption that all graphic objects are defined within the screen bounds. As such, image discarding and clipping operations are performed.

Figure 5:
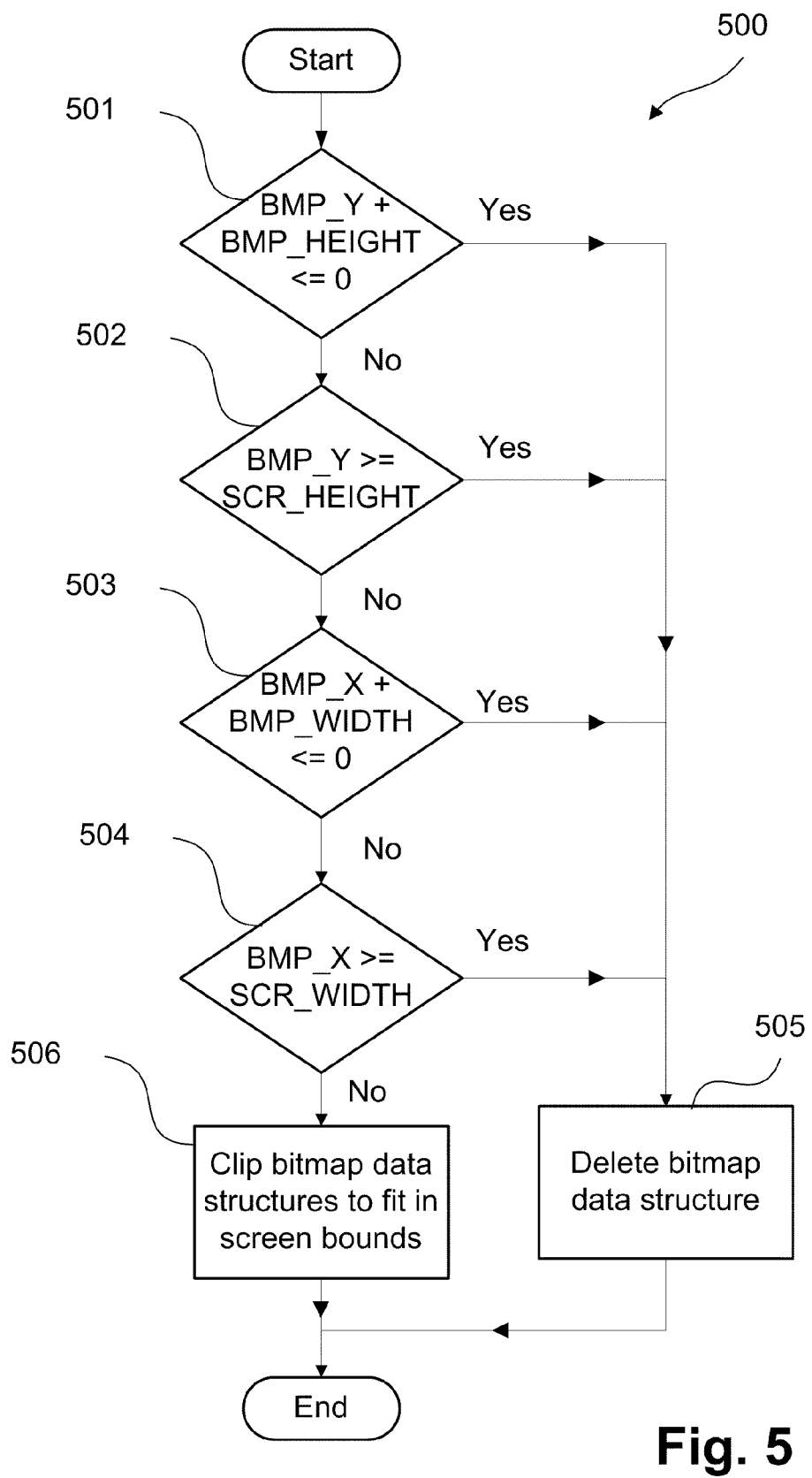
FIG. 5 is a flow diagram showing a method of discarding and clipping an image.
Figure 6:
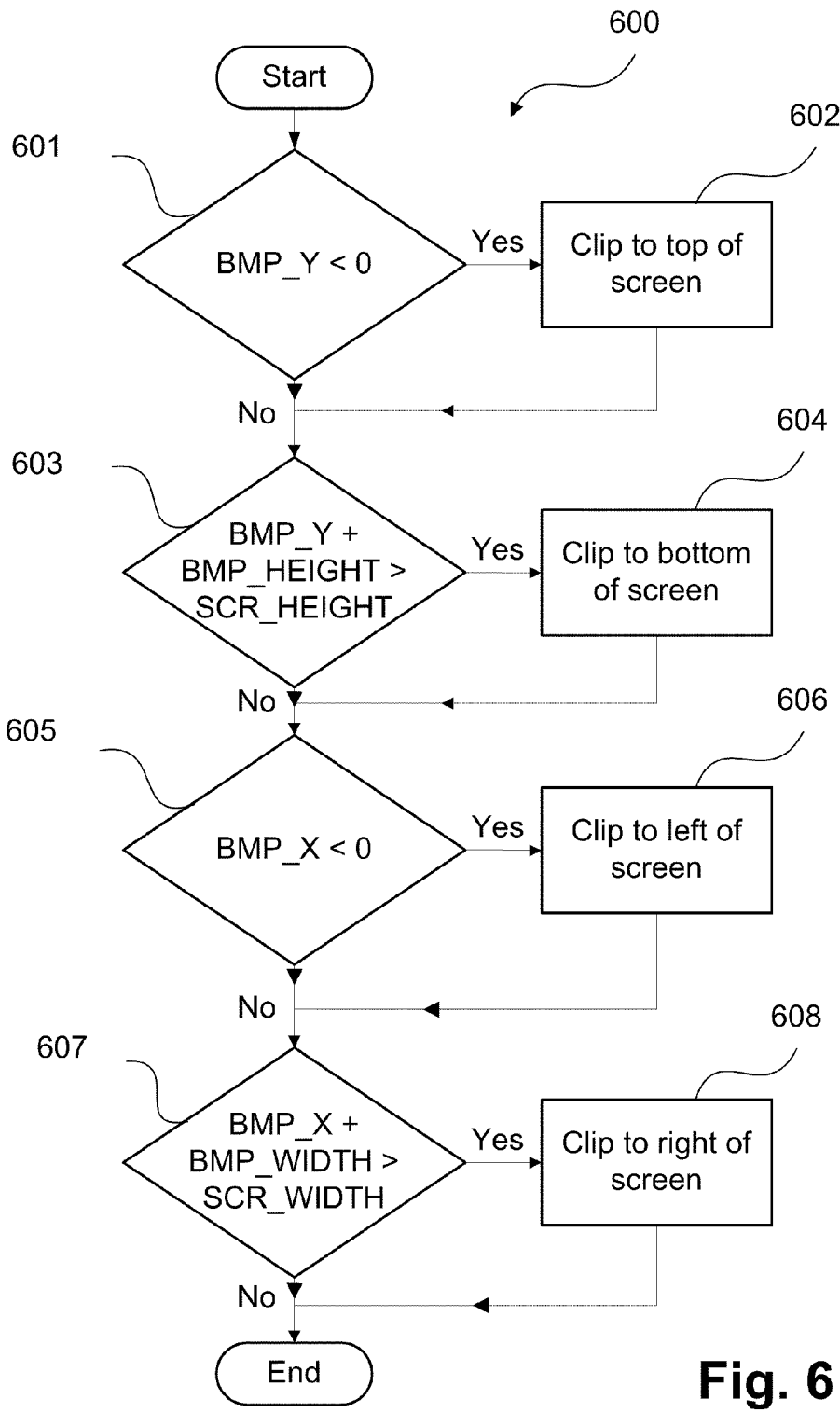
FIG. 6 is a flow diagram showing a method of clipping a bitmap image.

The method 500 of discarding and clipping an image, as executed at step 404, will described with reference to FIG. 5. The method 500 may be implemented as one or more code modules of the application program 133 resident in ROM 160 and being controlled in its execution by the processor 105.

The method 500 begins at 501, where if the processor 105 determines that the bitmap image is placed above the top edge of the screen displayed on the display device 114, then the method 500 proceeds to step 505. Otherwise, the method 500 proceeds to step 502. The determination is made by the processor 105 at step 501 by checking if the bottom edge of the bitmap image is above or coincides with the top edge of the screen (i.e., BMP_Y+BMP_HEIGHT<=0) displayed on the display device 114. At step 505, the bitmap data structure for the bitmap image is deleted by the processor 105. For example, the bitmap data structure may be removed from RAM 170.

At step 502, the processor 105 determines whether the bitmap image is placed below the bottom edge of the screen of the display device 114, by checking if the top edge of the bitmap image is below or coincides with the bottom edge of the screen (or bottom screen edge) displayed on the display device 114 (i.e., BMP_Y>=SCR_HEIGHT). If the bitmap image is placed below the bottom screen edge, then the method 500 proceeds to step 505. Otherwise, the method 500 proceeds to step 503. At step 505, the bitmap data structure for the bitmap image is deleted.

At step 503, the processor 105 determines whether the bitmap image is placed to the left of the left screen edge (i.e., the left edge of the screen being displayed on the display device 114), by checking if the right edge of the bitmap image is to the left of or is coincident with the left screen edge (i.e. (BMP_X+BMP_WIDTH)<=0). If the bitmap is placed to the left of the left screen edge, then the method 500 proceeds to step 505. Otherwise, the method 500 proceeds to step 504. At step 505, the bitmap data structure for the bitmap image is deleted.

At step 504, the processor 105 determines whether the bitmap image is placed to the right of the right screen edge (i.e., the right edge of the screen being displayed on the display device 114), by checking if the left edge of the bitmap image is to the right of or is coincident with the right screen edge (i.e. BMP_X>=SCR_WIDTH). If the bitmap is placed to the right of the right screen edge, then the method 500 proceeds to step 505. Otherwise, the method proceeds to step 506. At step 505, the bitmap data structure for the bitmap image is deleted.

At step 506, the bitmap image is clipped so that the bitmap image is entirely within the bounds of the screen displayed on the display device 114. A method 600 of clipping the bitmap image, as executed at step 506, will now be described with reference to FIG. 6. The method 600 may be implemented as one or more code modules of the application program 133 resident in ROM 160 and being controlled in its execution by the processor 105.

Any image that reaches the bitmap clipping stage 506 intersects with some region of the screen. The method 600 begins at step 601, where a check is performed by the processor 105 to determine whether the bitmap image overlaps the top edge of the screen being displayed on the display device 114. If the bitmap image does overlap the top edge of the screen (i.e., BMP_Y<0), then the method 600 continues to step 602, where the bitmap image is clipped so that the bitmap is aligned with the top edge of the screen of the display device 114. Following this clipping step 602, the method 600 continues to step 603. If at step 601 the processor 105 determines that the bitmap image does not overlap the top edge of the screen, then the method 600 continues directly to step 603.

At step 603, a check is performed by the processor 105 to determine whether the bitmap image overlaps the bottom edge of the screen. If the bitmap image does overlap the bottom edge of the screen (i.e., BMP_Y+ BMP_HEIGHT>SCR_HEIGHT), then the method 600 continues to step 604, where the bitmap image is clipped so that the bitmap image is aligned with the bottom edge of the screen. Following this clipping step 604, the method 600 continues to step 605. If at step 603 the processor 105 determines that the bitmap image does not overlap the bottom edge of the screen, then the processor 105 continues directly to step 605.

At step 605, a check is performed by the processor 105 to determine whether the bitmap image overlaps the left edge of the screen. If the bitmap image does overlap the left edge of the screen (i.e., BMP_X<0), then the method 600 continues to step 606, where the bitmap image is clipped so that bitmap image is aligned with the left edge of the screen. Following this clipping step 606, the method 600 continues to step 607. If at step 605 the processor 105 determines that the bitmap image does not overlap the left edge of the screen, then the method 600 continues directly to step 607.

At step 607, a check is performed by the processor 105 to determine whether the bitmap image overlaps the right edge of the screen. If the bitmap image does overlap the right edge of the screen, then the method 600 continues to step 608, where the bitmap image is clipped so that the bitmap image is aligned with the right edge of the screen. Following this clipping step 608, the clipping process has completed. If at step 607 the processor 105 determines that the bitmap image does not overlap the right edge of the screen, then the method 600 has completed.

In step 602, the bitmap image is clipped to align with the top edge of the screen by updating the bitmap data structure fields BMP_PIXEL_DATA 707, BMP_HEIGHT 704 and BMP_Y 702, as follows:

BMP_PIXEL_DATA=BMP_PIXEL_DATA+BMP_STRIDE*(-BMP_$Y$)

BMP_HEIGHT=BMP_HEIGHT+BMP_$Y$

BMP_Y=0

In particular, at step 602, the bitmap pixel data is updated to reference the first scanline of bitmap pixel data that is required to be rendered. This is achieved by offsetting the bitmap data address by exactly BMP_STRIDE*(-BMP_Y) bytes. The BMP_Y field is negative whenever this clipping step 602 is performed.

In step 604, the bitmap image is clipped to align with the bottom edge of the screen by updating the bitmap data structure field, BMP_HEIGHT 704, as follows:

BMP_HEIGHT=SCR_HEIGHT-BMP_$Y$

Accordingly, only the BMP_HEIGHT field 704 is updated at step 604. The values of other fields 701-703 and 705-708 are not changed.

In step 606, the bitmap image is clipped to align with the left edge of the screen by updating the bitmap data structure fields, BMP_PIXEL_DATA 707, BMP_WIDTH 703 and BMP_x 701 as follows:

BMP_PIXEL_DATA=BMP_PIXEL_DATA+BYTES_PER_PIXEL*(-BMP_$X$)

BMP_WIDTH=BMP_WIDTH+BMP_$X$

BMP_X=0

In particular, at step 606, the processor 105 updates the bitmap pixel data to reference the first column of bitmap pixel data that is required to be rendered. This is achieved by offsetting the bitmap data reference by exactly BYTES_PER_PIXEL*(-BMP_X) bytes, where BYTES_PER_PIXEL defines the number of bytes that one pixel of bitmap image data occupies. The BMP_X field 701 is negative whenever this clipping step 606 is performed.

In step 608, the bitmap image is clipped to align with the right edge of the screen by updating the bitmap data structure field, BMP_WIDTH 703, as follows:

BMP_WIDTH=SCR_WIDTH-BMP_$X$

Only the BMP_WIDTH field 703 is updated at step 608. The values of other fields 701-702 and 704-708 are not changed.

Referring to FIG. 4, in step 405, the processor 105 updates the bitmap data structure and sorts the bitmap data structure into a scan ordered list of bitmap data structures. The method 800 of updating and sorting a bitmap data structure will now be described in detail with reference to FIG. 8. The method 800 may be implemented as one or more code modules of the application program 133 resident in ROM 160 and being controlled in its execution by the processor 105.

The method 800 begins at step 801, where runtime field, SORT_Y 709, is initialised to the BMP_Y field 702 representing the starting column of the bitmap image.

At the next step 802, the runtime field, SORT_x 710, is initialised to the BMP_X field 701, representing the starting column of the image. Then at step 803, the runtime field, IS_ACTIVATING 711, is initialised to TRUE.

After step 803, the method 800 continues to step 804. In step 804, the bitmap data structure is insertion sorted into the bitmaps list configured within the RAM 170. The bitmaps list is sorted in scan order. That is, the bitmaps list is sorted lowest to highest, first by the SORT_Y field 709, and then by the SORT_X field 710 for items which have equal SORT_Y values. After step 804, the method 800 of updating and sorting a bitmap data structure is complete and the frame description (including the bitmaps list) is in a state where rendering can be performed.

Figure 12:
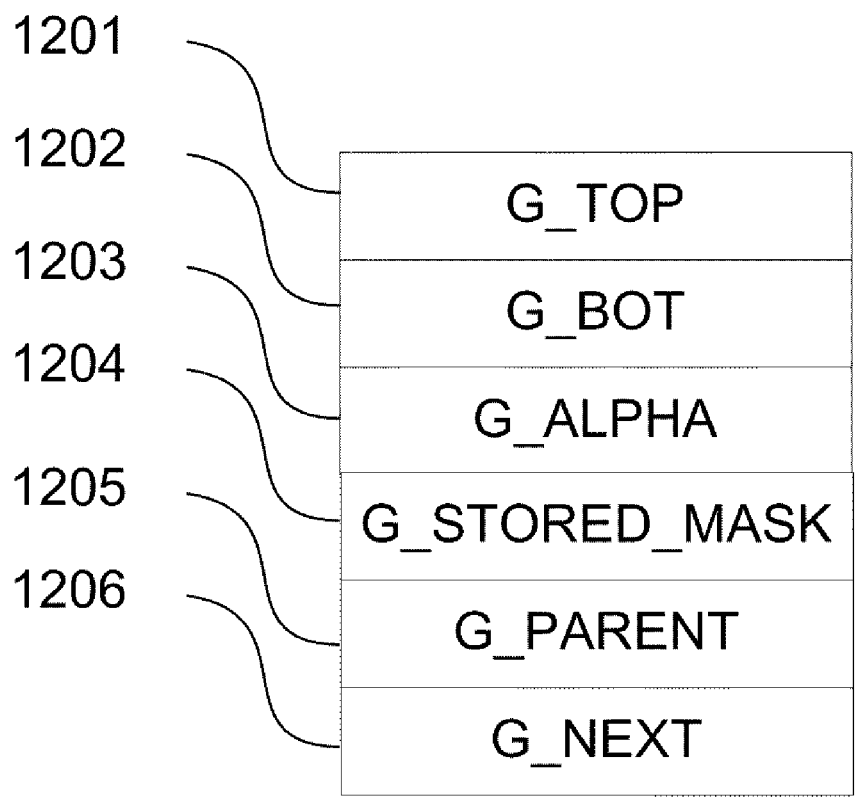
FIG. 12 is a diagram showing the fields of a group data structure.
Figure 13:
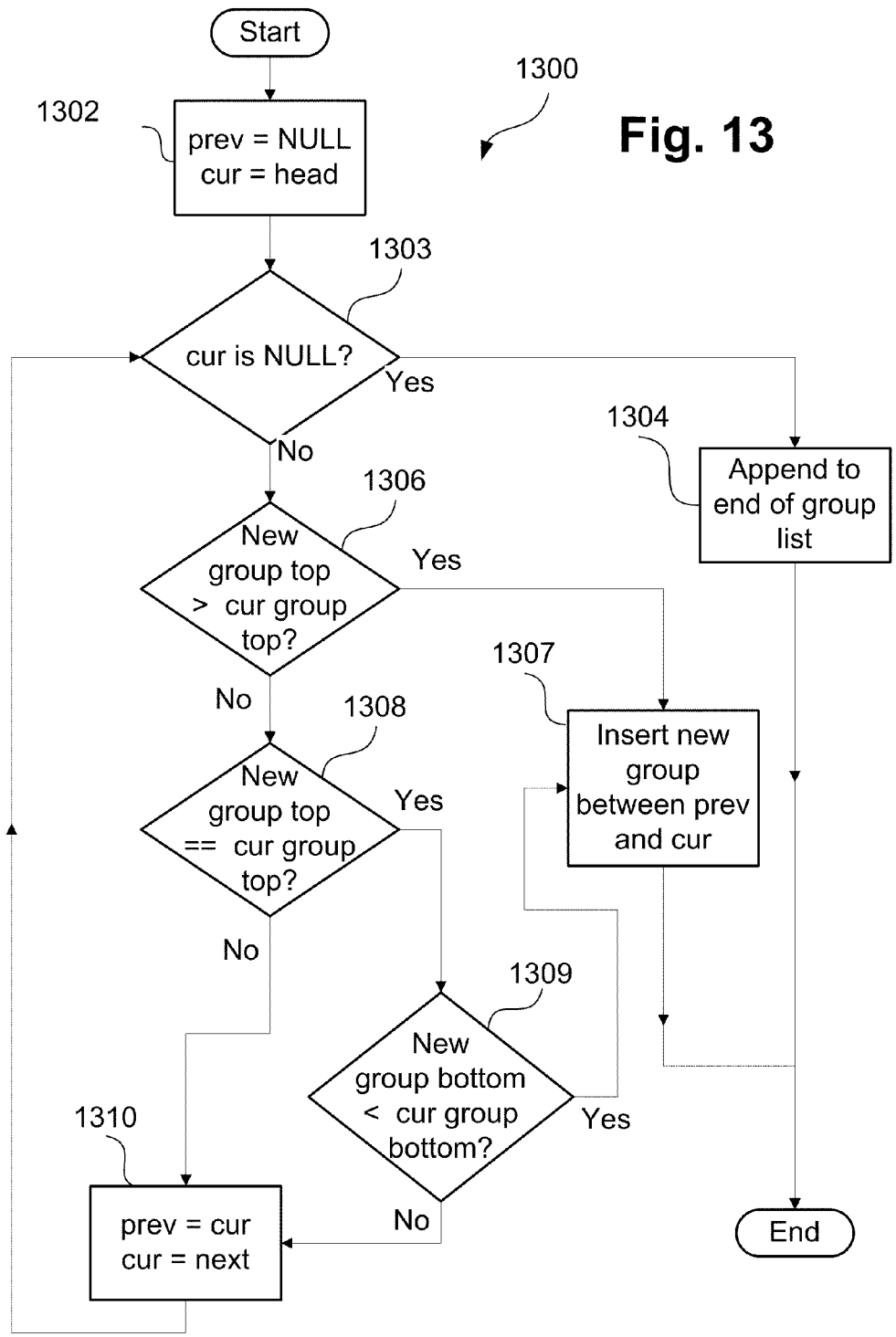
FIG. 13 is a flow diagram showing a method of adding a group data structure to a groups list.

In one embodiment, after bitmap images have been specified, groups of graphic objects and their corresponding group opacity values may be specified. For each such group of graphic objects, an API function is called to define parameters for the group of objects and a group data structure is added to the groups list. Referring to FIG. 12, the fields of a group data structure include the following:

G_TOP 1201, representing a top-most priority included in the group of graphic objects. The G_TOP field 1201 is an unsigned 16-bit quantity, where zero (0) refers to the graphic object nearest the background, G_BOT 1202, representing a bottom-most priority included in the group of graphic objects. The G_BOT field 1202 is an unsigned 16-bit quantity, where zero (0) refers to the graphic object nearest the background, G_ALPHA 1203, representing the group opacity. The G_ALPHA field 1203 is an unsigned 8-bit value, where zero (0) means completely transparent, and two-hundred and fifty-five (255) means completely opaque, G_STORED_MASK 1204, representing a reference to a mask stored in a storage medium such as RAM 170, G_PARENT 1205, representing a reference to a parent group data structure, G_NEXT 1206 representing a reference to a next group data structure in the groups list.

In one embodiment, the group opacity field, G_ALPHA 1203, may be specified for each pixel of the screen. In such an embodiment, a group opacity buffer configured within RAM 170 may be used to store a group opacity value for each pixel of the screen. Such a group opacity may be denoted $G\_ALPHA_{x,y}$.

In another embodiment, the group opacity G_ALPHA, 1203 may be specified for each scanline of the screen. In such an embodiment, a group opacity buffer configured within RAM 170 may be used to store a group opacity value for each scanline of the screen. Such a group opacity may be denoted $G\_ALPHA_y$.

In yet another embodiment, the group opacity G_ALPHA 1203, may be defined by some function of x and y. Accordingly, the group opacity may be a function of screen position.

When a definition for a group of objects is added to the frame description, a new group data structure is allocated and added into the groups list configured within RAM 170. As described above, the groups list contains all group data structures to be applied during the rendering of the frame. In one embodiment, the groups list is stored in a RAM 170 as a singly linked list. Before any groups are added into the frame description, the groups list is initialised to be empty. To initialise the groups list, a head pointer of the list is set to be NULL. The groups list is sorted highest to lowest, by the group top-most priority field, G_TOP 1201. Group data structures that have equal values for the G_TOP field 1201 are further sorted, lowest to highest, by group bottom-most priority according to the G_BOT field 1202. As described below, the groups list is sorted in this way for efficient processing during the compositing process 1400.

Each group of objects is defined by calls to an API function. For each group of objects, a group data structure is initialised and added to the groups list configured within RAM 170. A method 1300 of adding a new group data structure to the groups list will now be described with reference to FIG. 13. The method 1300 may be implemented as one or more code modules of the application program 133 resident in ROM 160 and being controlled in its execution by the processor 105.

The method 1300 begins at 1302, where a previous pointer, prev, is initialised to NULL and a current pointer, cur, is initialised to point to the head of the groups list configured within RAM 170. After this, the method 1300 continues to step 1303. At step 1303, the current pointer, cur, is compared with the NULL value. If the current pointer, cur, is NULL then the method 1300 continues to step 1304. At step 1304, the new group is appended to the end of the existing groups list configured within the RAM 170.

At step 1304, if the processor 105 determines that the existing groups list is empty, then the head pointer is set to point to the new group data structure and the next pointer of the new group data structure is set to be NULL. Still at step 1304, if the processor 105 determines that the existing groups list is not empty, then the next pointer of the previous group data structure is set to point to the new group data structure and the next pointer of the new group data structure is set to be NULL. After step 1304, the insertion of the new group data structure has been completed.

If at step 1303 the current pointer is found to be not NULL by the processor 105, then the method 1300 continues to step 1306. At step 1306, the processor 105 determines if the top-most priority as represented by the G_TOP field 1201 of the new group data structure is greater than the top-most priority as represented by the G_TOP field 1201 of the current group data structure. At 1306, if the result of the determination is TRUE, then the method 1300 continues to step 1307. At step 1307, the processor 105 inserts the new group data structure into the groups list configured within RAM 170 between the previous and current group data structures.

At step 1307, if the processor 105 determines that the previous pointer (i.e., prev) is NULL then the head pointer is set to point to the new group data structure and the next pointer (G_NEXT) of the new group data structure is set to point to the current group data structure. After step 1307 has been performed, the insertion of the new group data structure into the groups list is complete.

At step 1306, if the processor 105 determine that the result of the comparison is FALSE, then the method 1300 continues to step 1308. At step 1308, the processor 105 determines if the top most priority (G_TOP) of the new group data structure is equal to the top most priority (G_TOP) of the current group data structure. Then at step 1308, if the result of the comparison is TRUE then the method 1300 continues to step 1309. At step 1309, the processor 105 compares whether the bottom most priority (G_BOT) of the new group data structure is greater than the bottom most priority (G_BOT) of the current group data structure. At step 1309, if the result of the comparison is TRUE then the method 1300 continues to step 1307 where the new group data structure is inserted into the groups list configured within RAM 170 between the previous group and current group data structures.

At step 1309, if the result of the comparison is FALSE, then the method 1300 continues to step 1310 which involves advancing to the next group data structure. At step 1310 the previous pointer (i.e., prev) is set to point to the current group data structure and the current pointer (i.e., cur) is set to point to the next group data structure in the groups list or NULL if at end of list. Following step 1310, processing continues at step 1303.

At step 1308, if the result of the comparison is FALSE, then the method 1300 continues to step 1310.

After the frame has been set up, an API function may be called by the processor 105 in order to commence the rendering of the frame. Upon the rendering commencing, a frame description (comprising scan ordered list of bitmap data structures and priority ordered list of group data structures) is rendered to a frame buffer configured within the RAM 170. The frame buffer is an area of memory where result pixel data is stored. After rendering is complete, the pixel data of the frame buffer is in a format ready for display on the display device 114. Typically, the frame buffer contains scan ordered pixel data. That is, typically, pixel data in the frame buffer is ordered scanline by scanline from the top of display to the bottom of display, where pixels within a scanline appear in left to right order. In one embodiment, the processor 105 outputs composited pixels to a scan ordered frame buffer.

The pixel data within the frame buffer is of a particular pixel format. A common frame buffer pixel format is RGB888, which consists of eight (8) bits of red channel data, followed by eight (8) bits of green channel data and eight (8) bits of blue channel data, giving a total of twenty-four (24) bits per pixel. Many other pixel formats exist which use a different number of bits per channel, or use a different ordering of colour channels or use an entirely different colour space to represent pixel data.

For certain applications, the frame buffer may contain alpha (opacity) information. A frame buffer using the RGBA8888 pixel format allows an eight (8) bit opacity value to be stored for each pixel in addition to red, green and blue channel data. This opacity information is referred to as an alpha channel. The presence of an alpha channel in the frame buffer allows the frame buffer itself to be alpha-composited with other images at a later stage. In one embodiment, the processor 105 writes composited pixels to a frame buffer using the RGBA8888 pixel format.

The size of the frame buffer depends on the frame buffer pixel format and the width and height of the display in pixels. The minimum size of the frame buffer (in bits) is provided by Equation 6, below:

$$\text{frame\_buffer\_size} = \text{BITS\_PER\_PIXEL} * \text{SCR\_WIDTH} * \text{SCR\_HEIGHT}$$

In some instances, a memory offset may be introduced between scanlines of pixel data in the frame buffer. This, for example, allows the start of each scanline to be aligned to a thirty-two (32) bit boundary in the memory address space. Introducing a memory offset between scanlines of pixel data may also allow a subregion of a larger buffer to be used as the frame buffer. To facilitate such a memory offset between scanlines, a stride value is associated with the frame buffer. The stride value is equal to the number of bytes between the start of one scanline and the start of the following scanline. If there is no memory offset between scanlines, then the stride value (in bytes) is given by the Equation (7), as follows:

$$stride=(BITS\_PER\_PIXEL*SCR\_WIDTH)/8 \qquad (7)$$

If the memory offset between scanlines is scanline_offset bytes, then the stride value (in bytes) is given by the Equation (8), as follows:

$$stride=((BITS\_PER\_PIXEL*SCR\_WIDTH)/8)+\\ scanline\_offset \qquad (8)$$

As described herein, the processor 105 processes bitmap images to identify scan ordered runs of pixels. For each run of pixels, compositing is performed to display the run of pixels on the display device 114. The required compositing for a run of pixels is performed in accordance with a method 1400 of compositing variable opacity objects, which will be described in detail below with reference to FIG. 14. Each time the method 1400 is performed, a corresponding run of pixels is written to the frame buffer configured within the RAM 170.

Figure 9:
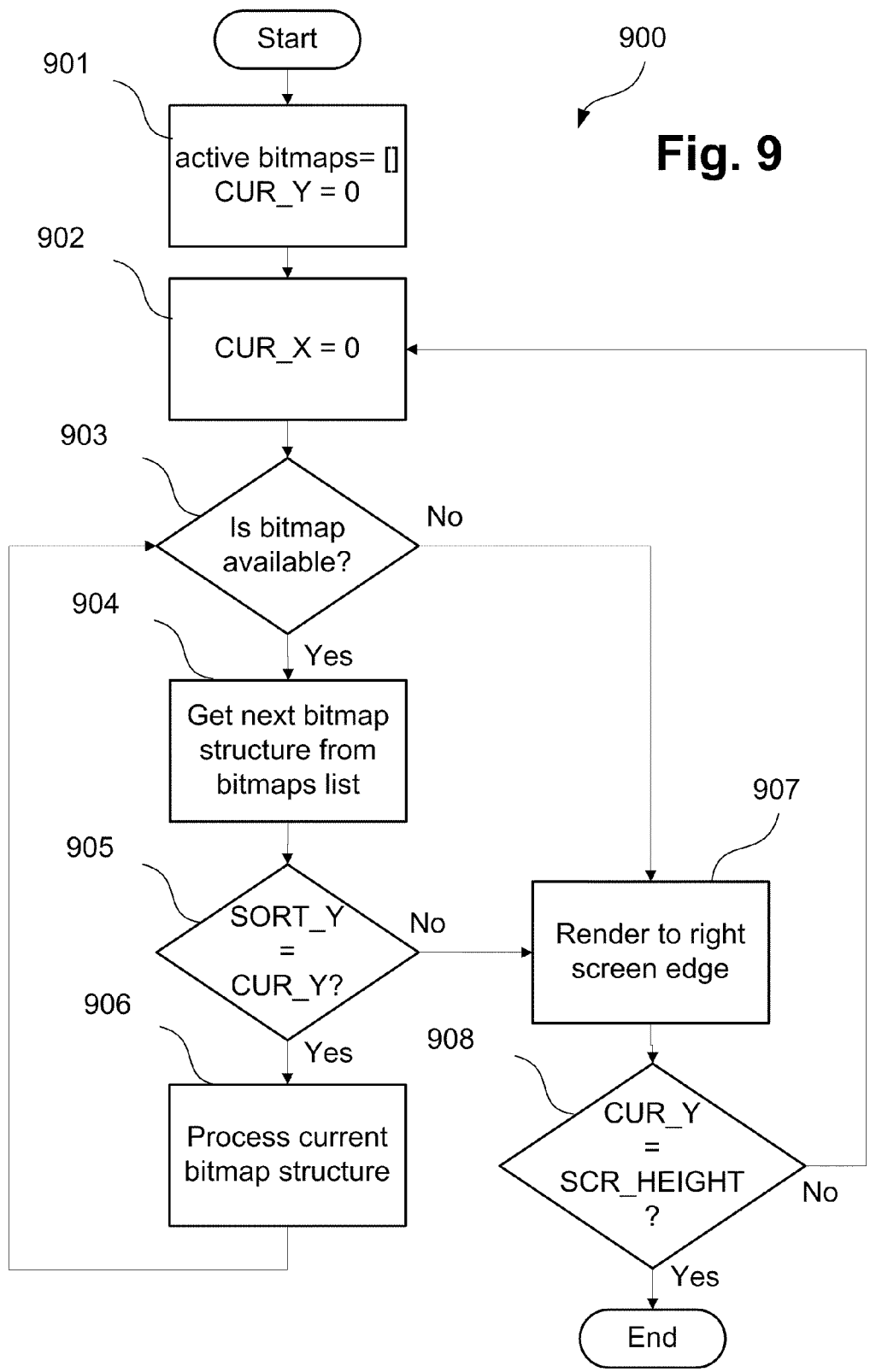
FIG. 9 is a flow diagram showing a method of rendering a scan-line.

In one embodiment, each scan-line of the display is rendered in scan order. FIG. 9 is a flow diagram showing a method 900 of rendering each scan-line. The method 900 may be implemented as one or more code modules of the application program 133 resident in ROM 160 and being controlled in its execution by the processor 105.

The method 900 begins at step 901, where a list of active bitmaps is initialised to be empty by the processor 105. This list may be configured within the RAM 170 and is referred to as the active bitmaps list. The active bitmaps list is initially empty and is used to store pointers to bitmap data structures. The active bitmaps list is sorted, highest to lowest, by bitmap priority value (BMP_PRIORITY). The active bitmaps list is later used during the compositing process in accordance with the method 1400 to specify the bitmaps to be composited for a particular run of pixels. In addition to the active bitmaps list, a value used to track the current scan-line (CUR_Y) is initialised to a value of zero (0) to indicate the first scan-line to render. In one embodiment, the first (i.e. top-most) scan-line in the screen displayed on the display device 114 will have a CUR_Y value of zero (0) and the final (i.e. bottom-most) scan-line has a CUR_Y value one (1) less than the height of the screen in pixels (i.e. SCR_HEIGHT−1).

An additional value to be tracked is the current column (CUR_X) within the current scanline. At step 902, the CUR_X value is set to zero (0) by the processor 105.

Figure 10:
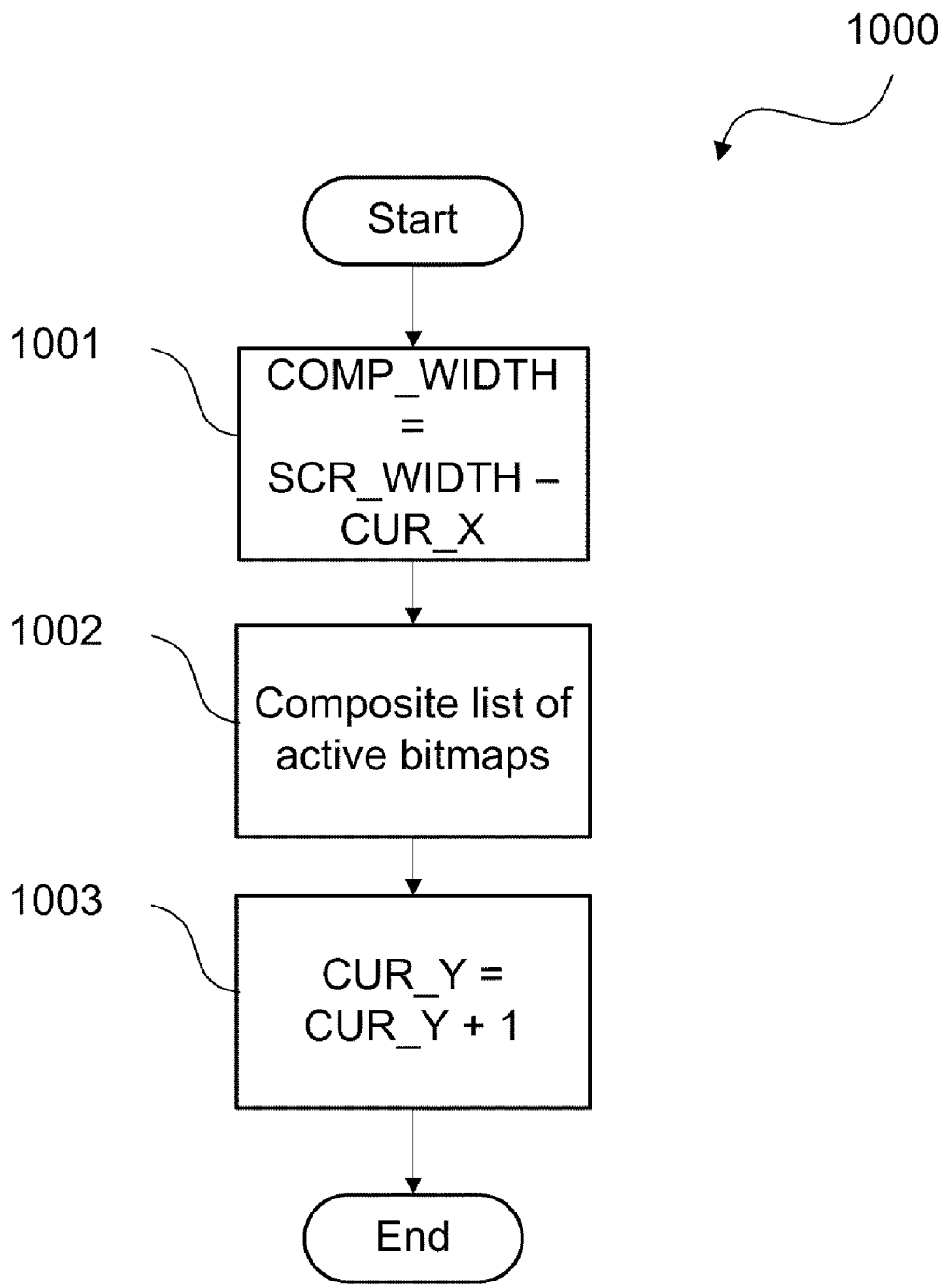
FIG. 10 is a flow diagram showing a method of rendering to the right screen edge.

After step 902, the method 900 continues to step 903, where the processor 105 determines whether there is a next bitmap available for processing. This is determined by comparing the head pointer of the bitmaps list with NULL. If no next bitmap exists, then the method 900 continues to step 907 where the current scanline is rendered from the current column within the scanline (CUR_X) to the right screen edge. A method 1000 of rendering to the right screen edge, as executed at step 907, is shown in FIG. 10 and will be described in more detail below.

At step 903, if a next bitmap does exist, then the method 900 continues to step 904 where the next bitmap data structure from the bitmaps list is retrieved by the processor 105. The step of retrieval at step 904 does not remove the bitmap data structure from the bitmaps list, but accesses the fields contained within the bitmap data structure.

After step 904, the method 900 continues to step 905, where a test is performed by the processor 105 to determine whether the retrieved bitmap intersects with the current scan-line (CUR_Y). To determine this, the SORT_Y field of the bitmap data structure is compared with the CUR_Y value. If the processor 105 determines that the currently retrieved bitmap intersects with the current scanline, then the method 900 continues to step 906 where the bitmap data structure retrieved is processed. A method 1100 of processing a current bitmap data structure, as executed at step 906, will be described in detail below with reference to FIG. 11. After step 906, the method 900 continues to step 903 to retrieve the next bitmap if one exists.

At step 905, if the processor 105 determines that the retrieved bitmap does not intersect with the current scan line being processed, then there are no more images that need to be rendered for the current scan line and the method 900 continues to step 907. At step 907, the current scanline is rendered from the current column within the scanline (CUR_X) to the right screen edge, in accordance with the method 1000.

At step 907, after a scanline has been rendered to the screen edge, the current scanline (CUR_Y) is incremented. After step 907, the method 900 flows to 908 where the processor 105 performs a test to check whether the last scanline on the screen has been rendered. If the last scanline on the screen has not been reached, then the processor 105 continues to step 902 to render the next scanline.

The method 1000 of rendering to the right edge of the screen, will now be described. The method 1000 may be implemented as one or more code modules of the application program 133 resident in ROM 160 and being controlled in its execution by the processor 105.

The method 1000 begins at step 1001, where the processor 105 determines a composite width value. The composite width value is the number of pixels to be composited and rendered in accordance with the method 1400 (i.e., the compositing process). The composite width is stored in a variable named COMP_WIDTH configured within the RAM 170. To render the remaining pixels in the current scanline, the COMP_WIDTH value is calculated by deducting the current column position (CUR_X) from the total number of pixels in a scanline (SCR_WIDTH). After step 1001, the method 1000 continues to step 1002, where the compositing process is performed by the processor 105 in accordance with the method 1400. The method 1400 (i.e., the compositing process) involves processing the graphic objects in the active bitmap list and will be described in more detail later. After step 1002, the method 1000 continues to step 1003 where the current scanline variable (CUR_Y) is incremented to indicate rendering is advancing to the next scanline. After step 1003, the method 1000 of rendering to the right edge of the screen is complete.

Figure 11:
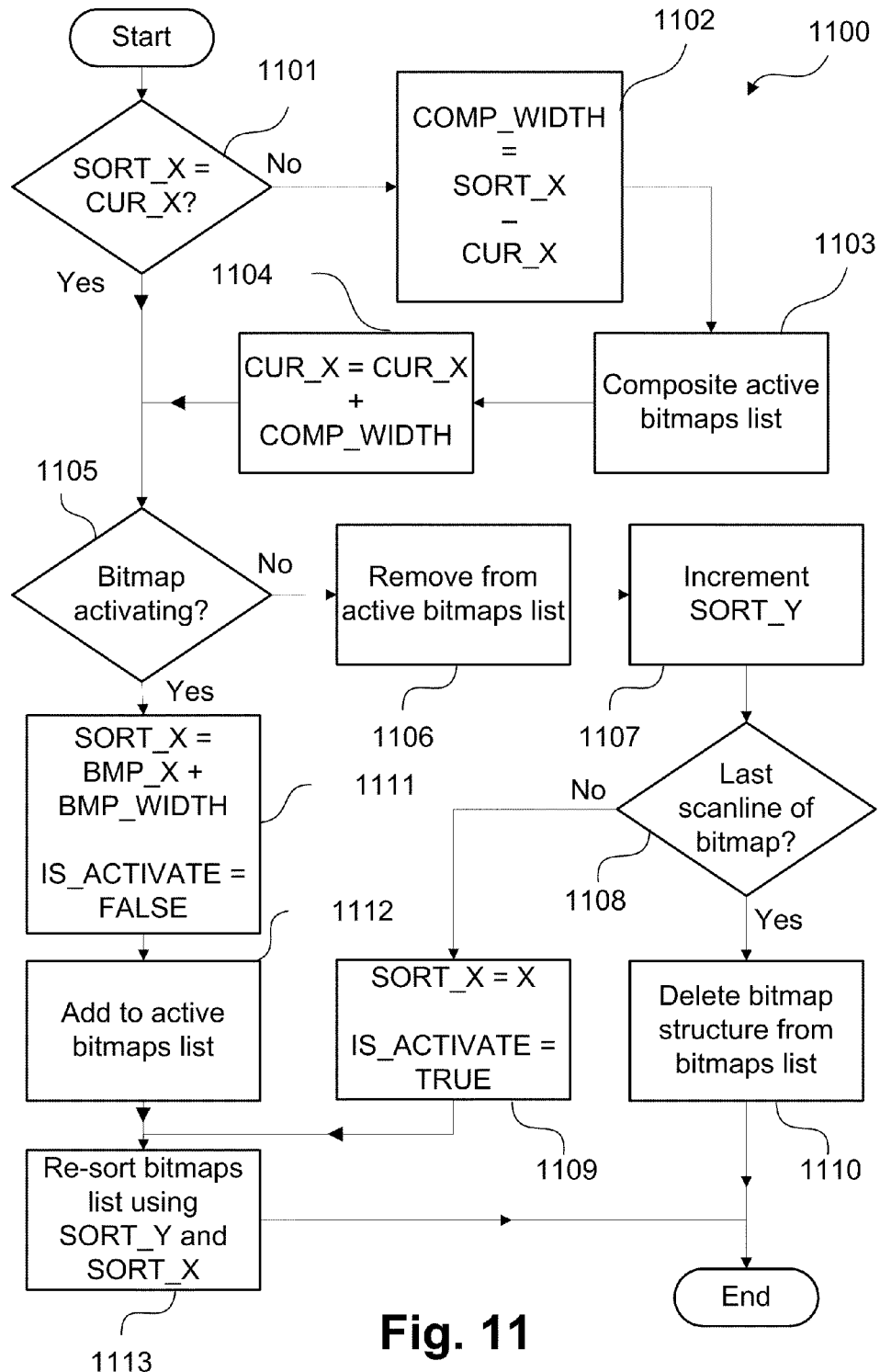
FIG. 11 is a flow diagram showing a method of processing a current bitmap data structure.

The method 1100 of processing a current bitmap data structure, as executed at step 906, will now be described with reference to FIG. 11. The method 1100 may be implemented as one or more code modules of the application program 133 resident in ROM 160 and being controlled in its execution by the processor 105.

The method 1100 begins at step 1101, where a check is performed by the processor 105 to determine if the current bitmap starts in the current column in the current scanline being processed. If the bitmap image does not start at the current column, then the method 1100 continues to step 1102, where the processor 105 determines the number of pixels (COMP_WIDTH) between the current column and the starting column of the current bitmap (SORT_X). Following step 1102, at step 1103, using the current row (CUR_Y), the current column (CUR_X), the number of pixels to be composited (COMP_WIDTH) and the active bitmaps list, a compositing process is performed by the processor 105 in accordance with the method 1400.

Following step 1103, the method 1100 continues to step 1104 where the current column variable (CUR_X) is incremented by the number of composited pixels (COMP_WIDTH). After step 1104, the method 1100 flows to step 1105.

At 1101, if it is determined that the current bitmap starts in the current column, then the method 100 flows to step 1105.

At step 1105, the current bitmap data structure is examined by the processor 105 to determine if the current bitmap data structure is associated with the activating (left) or deactivating (right) side of a bitmap image. A bitmap data structure with IS_ACTIVATE flag set to TRUE marks the activating (left) side of a bitmap. Such a bitmap data structure may be referred to as an activating bitmap data structure.

If at step 1105, an activating bitmap data structure is encountered by the processor 105, then the method 1100 moves to step 1111 where the bitmap data structure fields are updated so that the bitmap data structure fields mark the ending column for the current bitmap. In particular, at step 1111, the processor 105 adds the bitmap width (BMP_WIDTH) to the SORT_X field, and sets the IS_ACTIVATE flag to FALSE. Once these fields have been adjusted, the method 1100 moves to step 1112 where a pointer to the bitmap data structure is added into the active bitmaps list configured within the RAM 170, such that the bitmap data structure of the active bitmaps list are sorted from highest to lower by the bitmap priority value (BMP_PRIORITY). After step 1112, the method 1100 continues to step 1113, where the processor 105 re-sorts the bitmaps list configured within RAM 170 to ensure that the bitmap data structure is in the correct position within the bitmaps list according to the updated field values. The re-sorting step 1113 results in the bitmap data structures of the bitmaps list being sorted in scan order. That is, the bitmaps list is sorted lowest to highest, first by the SORT_Y field 709, and then by the SORT_X field 710 for items which have equal SORT_Y values.

If at step 1105 a deactivating bitmap data structure is encountered by the processor 105, then the method 1100 moves to step 1106 where the bitmap data structure is removed from the active bitmaps list. Following step 1106, the method 1100 continues to step 1107, where the SORT_Y field of the bitmap data structure is incremented to indicate the next scanline of the bitmap which will need rendering.

Following step 1107, the method 1100 continues to step 1108, where the processor 105 determines if the last scanline of the bitmap image has been reached. In particular, at step 1108, the processor 105 compares whether the SORT_Y value is equal to BMP_Y+BMP_HEIGHT. If this test returns FALSE then the method 1100 flows to step 1109. At step 1109, the SORT_X field of the bitmap data structure is set to be equal to the left column value of the bitmap (BMP_X) and the IS_ACTIVATE flag is set to a value of TRUE. Following step 1109, at the next step 1113, the bitmaps list is re-sorted by the processor 105. After step 1113, the processing of a current bitmap data structure is complete.

If the processor 105 determines at step 1108 that the last scanline of the bitmap has been reached, then the method 1100 continues to step 1110. At step 1110, the processor 105 removes the bitmap data structure from the bitmaps list so that the bitmap data structure is not processed on subsequent scanlines. After step 1110, the processing of a current bitmap data structure is complete.

The compositing process 1400 composites a number of graphic objects using a top-down compositing order. The method 1400 (compositing process) accepts a number of RGBA8888 pixel format bitmap image graphic objects to be composited. Alternatively, pixel formats other than RGBA8888 may also be used. The following parameters are determined before the method 1400 (compositing process) is invoked by the processor 105:
  current row (CUR_Y) of pixels to be rendered;
  start column (CUR_X) of the run of pixels to be rendered;
  number of pixels in the current row of pixels to be rendered (COMP_WIDTH);
  priority ordered active bitmap list containing the graphic objects to be composited;
  priority ordered groups list; and
  a frame buffer (FRAME_BUF) configured within RAM 170.

In accordance with the method 1400 (compositing process), group opacity is applied to the graphic objects of the active bitmaps list configured within RAM 170. The application of group opacity is performed in accordance with the group data structure definitions of the groups list. The method 1400 (compositing process) composites the graphic objects of the active bitmaps list and renders a run of pixels to the frame buffer configured within RAM 170. The number of pixels in the run of pixels to be rendered is equal to the composite width (COMP_WIDTH). In one embodiment, the maximum composite width is equal to the screen width in pixels (SCR_WIDTH).

In another embodiment, the maximum composite width is limited to a value less than the screen width in pixels (SCR_WIDTH). Such a limitation reduces RAM 170 requirements at the cost of some additional processing overhead.

During compositing, as graphic objects are processed top to bottom in a top down compositing fashion, a mask stored in a mask buffer configured within RAM 170 is used to store remaining opacity which can be applied to those graphic objects yet to be processed. In one embodiment, each value of the mask is a one (1) byte quantity holding a value between zero (0) and two hundred and fifty five (255) inclusive. For each nested group that is entered, the mask is saved into a temporary mask stored in a temporary mask buffer configured within RAM 170 for later use. Each mask buffer is large enough to hold mask values for each pixel in the run of pixels to be rendered. The maximum mask buffer size is defined by the maximum composite width required during compositing.

A mask value corresponding to a particular pixel in the mask may be denoted $mask_{pixel}$.

As compositing takes place, result pixel colour and opacity values accumulate in a compositing buffer configured within the RAM 170. The compositing buffer is large enough to hold pixel values for the run of pixels to be rendered. The compositing buffer has a maximum size defined by the maximum composite width required during compositing.

A particular pixel in the compositing buffer may be denoted as $composite\_buffer_{pixel}$.

A particular colour or opacity channel (r, g, b, a) corresponding to a particular pixel in the compositing buffer may be denoted as $composite\_buffer_{pixel,channel}$.

Each value of the mask corresponds to exactly one pixel in the compositing buffer.

After compositing of all pixels in a run has completed, the result pixel values are read from the compositing buffer, converted to the required frame buffer pixel format and written to the frame buffer configured within RAM 170. The pixel data in the frame buffer is in a format suitable for display on the display 114.

The method 1400 of compositing graphic objects, including variable opacity graphic objects, will now be described with reference to FIG. 14. One or more of the graphic objects are attenuated by group opacity. As described above, the method 1400 may be referred to as the compositing process.

The method 1400 may be implemented as one or more code modules of the application program 133 resident in ROM 160 and being controlled in its execution by the processor 105.

The method 1400 begins at step 1402, where a number of initialisations are performed by the processor 105. In particular, a primary mask is initialised within RAM 170 such that all mask values have value two hundred and fifty five (255). Accordingly, the processor 105 performs that step of initialising the primary mask. The initialised primary mask may be referred to as a first mask. Further, the compositing buffer is initialised so that red, green, blue and alpha components are zero and a NEXT_GROUP variable is set to point to the first rendering group in the groups list. Finally, also at step 1402, a MASK_ALL_ZERO flag is initialised to FALSE. The NEXT_GROUP variable indicates the next new group in the groups list that needs to be processed during the execution of the method 1400 (compositing process).

Following step 1402, the method 1400 (compositing process) continues to step 1403, where the current graphic object is set to be the first graphic object in the active bitmap list configured within RAM 170. After step 1403, processing continues to step 1404, where the processor 105 performs a test to determine whether the current graphic object is the start graphic object of a group. Step 1404 is achieved by comparing the priority (BMP_PRIORITY) of the current graphic object with the start priority (G_TOP) of the NEXT_GROUP in the groups list. If the current graphic object does correspond to the start graphic object of a group, then the method 1400 proceeds to step 1407. Otherwise, the method 1400 proceeds to step 1405 to process the current graphic object. The current graphic object is processed at step 1405 in accordance with a method 1700 of processing a current graphic object, which will described in detail below with reference to FIG. 17. At step 1405, the following variables and buffers may be updated:

the primary mask values;
the MASK_ALL_ZERO flag; and
the compositing buffer values.

After step 1405, processing flows to step 1409.

Figure 15:
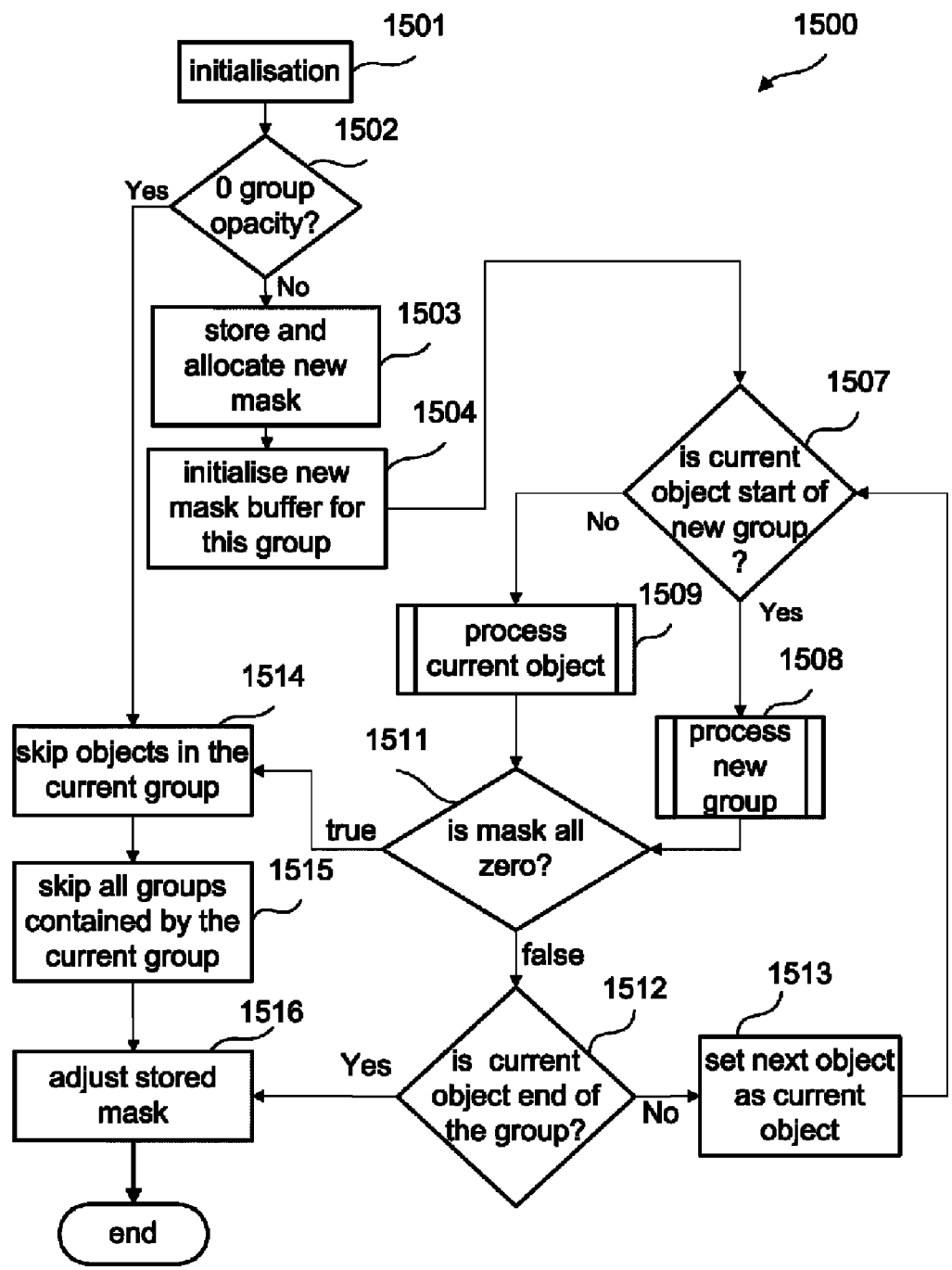
FIG. 15 is a flow diagram showing a method of processing grouped graphic objects as used in the method of FIG. 14.
Figure 16:
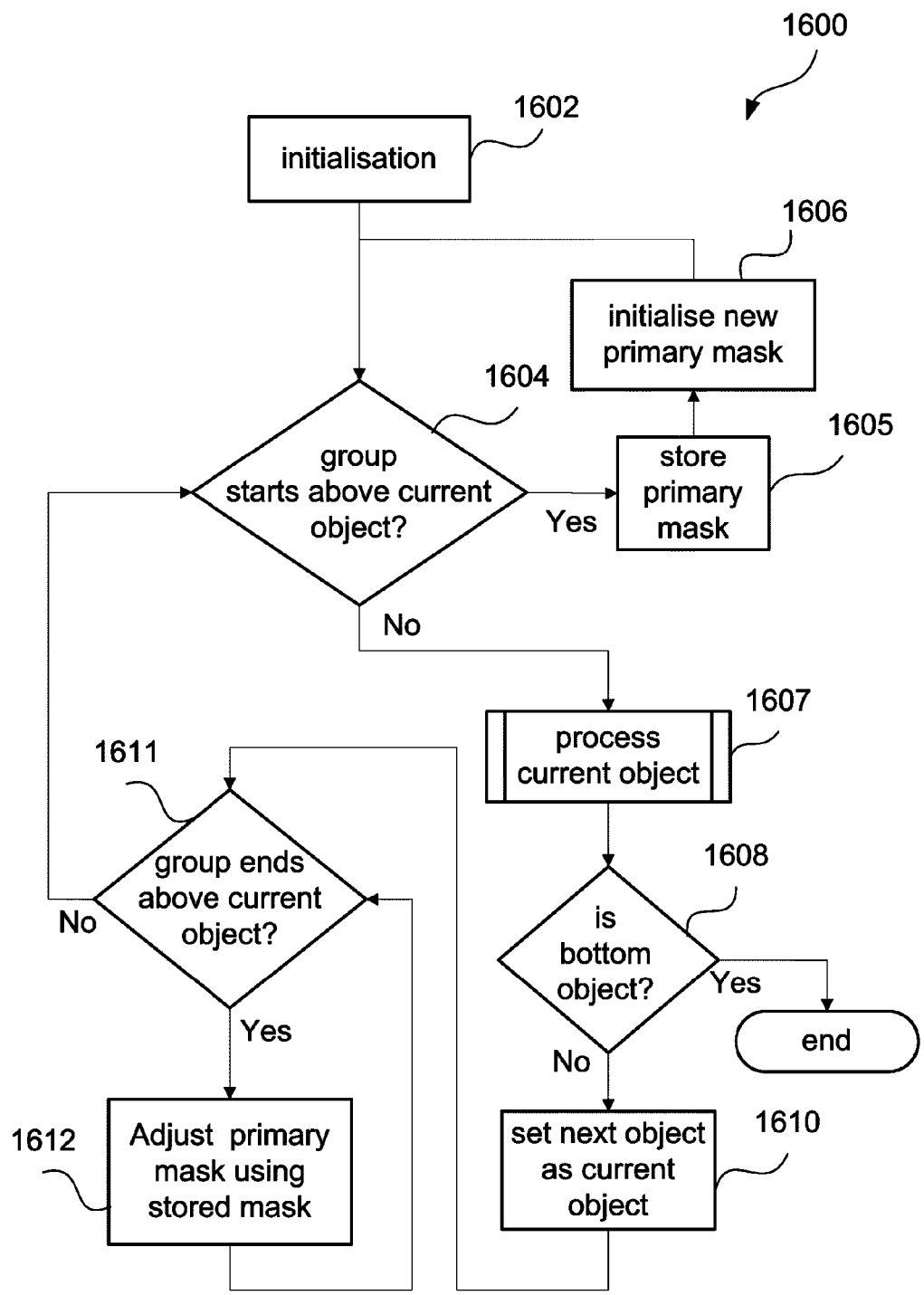
FIG. 16 is a flow diagram showing a method of compositing variable opacity objects.

At step 1407, the group of graphic objects is processed in accordance with a method 1500 of processing grouped graphic objects, which will be described in detail below with reference to FIG. 15. The method 1500 may be referred to as a process group method. The processing of a group may update the primary mask values, current graphic object, NEXT_GROUP and MASK_ALL_ZERO flag accordingly. The current graphic object will have been set to refer to the last (i.e. bottom-most) graphic object of the group as the group will have been processed. After step 1407, the method 1400 proceeds to step 1409.

At step 1409, the processor 105 tests the MASK_ALL_ZERO flag. If the MASK_ALL_ZERO flag is set to TRUE, then the remaining graphic objects in the active bitmaps list do not need to be processed and the method 1400 (compositing process) is complete. Otherwise, at step 1409, if the MASK_ALL_ZERO flag is set to FALSE, then the method 1400 continues to step 1410.

At step 1410, the processor 105 checks whether the current graphic object is the bottom-most graphic object to be processed (i.e. the last bitmap data structure in the active bitmaps list). If the current graphic object is not the bottom-most graphic object, then the method 1400 continues to step 1411 where the graphic object below the current graphic object (BMP_NEXT) is set as the new current graphic object. After step 1411, the method 1400 loops back to step 1404 to process the new current graphic object. If, at step 1410, the current graphic object is the bottom-most graphic object to be processed, then the method 1400 (compositing process) is complete, as there are no more graphic objects to be processed.

The method 1500 of processing grouped graphic objects will now be described with reference to FIG. 15. As described above, the method 1500 may be referred to as the process group method. The method 1500 may be implemented as one or more code modules of the application program 133 resident in ROM 160 and being controlled in its execution by the processor 105.

The input of the method 1500 includes a mask, which will be referred to as the primary mask in method 1500. The primary mask contains the mask values for each pixel in the run of pixels to be rendered. The input to the method 1500 also includes the current row (CUR_Y) being rendered, the start column (CUR_X) of the run of pixels to be rendered and the number of pixels in the run to be rendered (COMP_WIDTH). The input to the method 1500 also includes a current graphic object (bitmap) in the active bitmap list, a current group in the priority ordered groups list and a frame buffer (FRAME_BUF).

The method 1500 starts at step 1501, where the processor 105 performs initialisation by setting the MASK_ALL_ZERO flag to FALSE and the NEXT_GROUP variable to reference the next group of the current group.

Following step 1501, at step 1502, the group opacity (G_ALPHA) of the current group is tested. If the group opacity is zero (0), then the method 1500 advances to step 1514. Otherwise, if the group opacity is not zero (0), then the method 1500 continues to step 1503.

At step 1503, the primary mask is stored for later use. This stored mask will be referred to as the stored mask. A new mask is allocated (or generated) within RAM 170, and this new mask becomes the second primary mask. The new mask is allocated with the same size as the stored mask as follows:

stored_mask=primary_mask allocate new_mask $2^{nd}$ primary_mask=new_mask

The above expressions involve assignments of references and no copying of buffer content is performed.

Then at step 1504, the second primary mask (i.e. the newly allocated mask or second mask) is initialised according to the opacity of the current group (G_ALPHA) and the stored mask. Accordingly, at step 1504, the processor 105 performs the step of generating the second primary mask. For each second primary mask value, the initialisation is carried out in accordance with Equation (9) as follows:

$$2^{nd} \text{primary\_mask}_{pixel} = \text{stored\_mask}_{pixel} * G\_ALPHA/255 \qquad (9)$$

In one embodiment, if the current group opacity is a variable opacity, then the second primary mask is initialised according to Equation (10) as follows:

$$2^{nd} \text{primary\_mask}_{pixel} = \text{stored\_mask}_{pixel} * G\_ALPHA_{pixel, CUR\_Y}/255 \qquad (10)$$

In another embodiment, if the current group opacity is a variable opacity in the vertical direction only, then the second primary mask is initialised according to Equation (11) as follows:

$$2^{nd} \text{primary\_mask}_{pixel} = \text{stored\_mask}_{pixel} * G\_ALPHA_{CUR\_Y}/255 \qquad (11)$$

Accordingly, the group opacity (G_ALPHA) may be a function of screen position. In yet another embodiment, the group opacity (G_ALPHA) value may be determined by evaluating some function of screen row and column position.

At step 1507 the current graphic object is tested by the processor 105 to determine whether the current graphic object corresponds to the start graphic object of a new rendering group. The processor 105 makes the determination at step 1507 by examining the start priority (G_TOP) of the NEXT_GROUP in the groups list. If the current graphic object is the start of a new group, the method 1500 continues to step 1508 and the new group is processed by recursively calling the process group method 1500 itself. The processing of the new rendering group may update the values of the second primary mask, the MASK_ALL_ZERO flag, the current graphic object pointer and the NEXT_GROUP accordingly. After processing the new group at step 1508, the current graphic object will have been set to the end graphic object of the new group, as the new group will have been processed at step 1508. Otherwise, at step 1507, if the current graphic object is not the start of a new rendering group then the method 1500 proceeds to step 1509. At step 1509, the current graphic object is processed in accordance with the method 1700 of processing the current graphic object described below using the second primary mask.

After step 1509, the method 1500 continues to step 1511, where the MASK_ALL_ZERO flag is tested. If the MASK_ALL_ZERO flag is FALSE, then the method 1500 continues to step 1512, where the current graphic object is tested to determine whether the current graphic object corresponds to the end graphic object of the current rendering group. Step 1512 is performed by testing if there is a next graphic object (BMP_NEXT) with priority (BMP_PRIORITY) greater than or equal to the bottom-most priority (G_BOT) of the current group. If the current graphic object is not the end graphic object of the current group, then at the next step 1513, the graphic object below the current graphic object (BMP_NEXT) is set to be the new current graphic object. After step 1513, the method 1500 loops back to step 1507 to process the new current graphic object. At step 1512, if the current graphic object is the end graphic object of the current rendering group, the method 1500 continues to step 1516 where the stored mask is adjusted before the processing of the group finishes.

If the group opacity is zero at step 1502, or the MASK_ALL_ZERO flag is set to TRUE at step 1511, then the method 1500 continues to step 1514.

At step 1514, all graphic objects contained within the current group are skipped. A graphic object O is considered to be "contained within" a group G if the graphic object O satisfies the following condition:

G.G_BOT<=O.BMP_PRIORITY<=G.G_TOP

Step 1514 is performed by setting the current graphic object to be the end (bottom-most) graphic object within the current group. Following step 1514, the method 1500 advances to step 1515.

At step 1515, all groups contained within the current group are skipped. A group CHILD is considered to be contained within another group PARENT if the top priority of the group CHILD is smaller or equal to the top priority of the group PARENT and the bottom priority of the group CHILD is greater or equal to the bottom priority of the group PARENT. Step 1515 is performed by scanning the group list from the current group until a group is found that is not contained within the current group. The NEXT_GROUP variable is updated to point to the first group not contained within the current group, or NULL if no such group is found. Following step 1515, the method 1500 advances to step 1516.

At step 1516, the stored mask may be adjusted by the processor 105. If the group opacity (G_ALPHA) is zero, then the stored mask adjustment is not performed. In this case there is no adjustment needed. If the group opacity is not zero, then the mask adjustment is carried out in accordance with Equation (12) as follows:

$$\text{stored\_mask}_{pixel} = 2^{nd}\text{primary\_mask}_{pixel} + (255 - G\_ALPHA)/255 * \text{stored\_mask}_{pixel} \qquad (12)$$

Following the stored mask adjustment, the stored mask is returned to the primary mask for subsequent processing. The MASK_ALL_ZERO flag is also updated according to the values in the primary mask by setting the MASK_ALL_ZERO flag to true if the primary mask is all zero. The stored mask, restored as the primary mask, is updated using the second primary mask and the group opacity. The primary mask can then be used for compositing graphic objects located below the current object. After step 1516, the method 1500 is complete.

Figure 17:
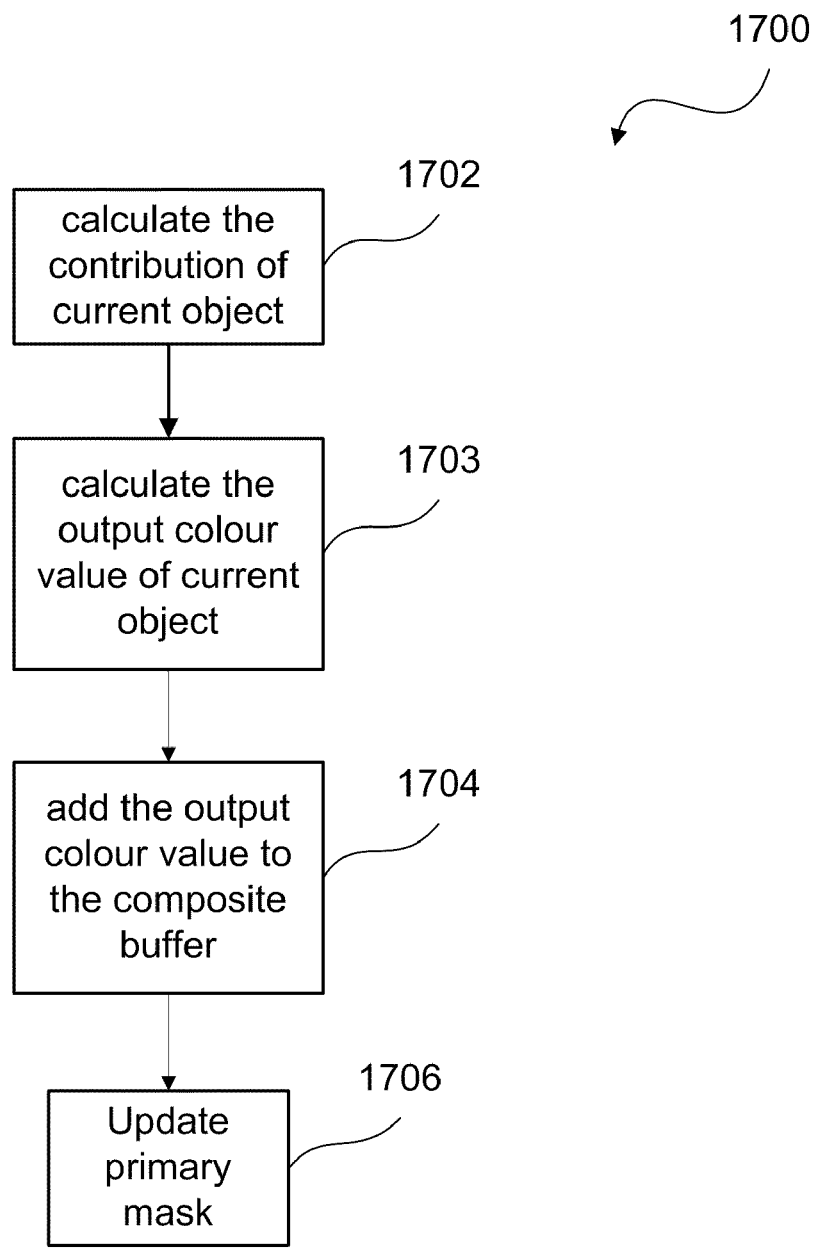
FIG. 17 is a flow diagram showing a method of processing a current graphic object as used in the method of FIG. 14, FIG. 15 and FIG. 16.

The method 1700 of processing a current graphic object will now be described in with reference to FIG. 17. The method 1700 may be implemented as one or more code modules of the application program 133 resident in ROM 160 and being controlled in its execution by the processor 105. The method 1700 operates on a primary mask. The primary mask is usually the equivalent of the second primary mask used in the method 1500 of FIG. 15 or the primary mask of the method 1400. Alternatively, the primary mask is the primary mask of a method 1600 which will be described below with reference to FIG. 16.

The method 1700 starts at step 1702, where the processor 105 performs the step of determining the contribution value (OBJ_CONTRIB) of each pixel of the current graphic object, based on the opacity of the graphic object (OBJ_ALPHA) and the values of the primary mask. The contribution value (OBJ_CONTRIB) of each pixel of the current graphic object may be determined in accordance with Equation (14) and represents a contribution of the graphic object to the compositing buffer. The contribution value can be calculated as follows:

$$\text{OBJ\_CONTRIB}_{pixel} = (\text{OBJ\_ALPHA}_{pixel} * \text{primary\_mask}_{pixel})/255 \qquad (14)$$

At step 1702, if the graphic object is a fully opaque image, i.e. the opacity of the graphic object (OBJ_ALPHA) is equal to two hundred and fifty five (255), then the calculation of the contribution (OBJ_CONTRIB) of each pixel of the current graphic object can be optimised, in accordance with Equation (15) as follows:

$$\text{OBJ\_CONTRIB}_{pixel} = \text{primary\_mask}_{pixel} \qquad (15)$$

Equation (15) is equivalent to Equation (14) when OBJ_ALPHA is equal to two hundred and fifty five (255).

The contribution value (OBJ_CONTRIB) is later used to update the values of the primary mask. In addition to setting the contribution of the current graphic object, at step 1702, if the graphic object is fully opaque then the MASK_ALL_ZERO flag is set to TRUE.

Then at step 1703, the processor 105 performs the step of determining an output colour value (OBLOUT_COL) of each pixel of the graphic object. The output colour value (OBLOUT_COL) is based on the colour (OBJ_COL) of the graphic object and the corresponding value of the primary mask. The red, green and blue colour channels of the output colour value (OBLOUT_COL) are determined in accordance with Equation (16) as follows:

$$\text{OBJ\_OUT\_COL}_{pixel,channel} = (\text{OBJ\_COL}_{pixel,channel} * \text{OBJ\_CONTRIB}_{pixel})/255 \qquad (16)$$

The opacity channel of the output colour value (OBJ_OUT_COL) is equal to the contribution value of the graphic object, in accordance with Equation (16b) as follows:

$$\text{OBJ\_OUT\_COL}_{pixel,a} = \text{OBJ\_CONTRIB}_{pixel} \quad (16b)$$

The determination of the opacity channel of the colour value (OBJ_OUT_COL) is a function of the contribution value (OBJ_CONTRIB) of the graphic object, in accordance with Equation (16). Furthermore, the contribution value (OBJ_CONTRIB) of the graphic object is a function of the primary mask value, in accordance with the Equation (14). Furthermore, the primary mask value is a function of group opacity (G_ALPHA), in accordance with Equation (9). Accordingly, the colour value (OBJ_OUT_COL) is determined at step 1703 using the group opacity (G_ALPHA). The contribution value (OBJ_CONTRIB) is also used in updating the mask. Further, the determined colour value (OBJ_OUT_COL) includes an opacity value, in accordance with Equation (16b).

After the output colour value (OBJ_OUT_COL) for each channel has been determined, at step 1704, the processor 105 performs the step of compositing the output colour with a compositing buffer. In particular, at step 1704 each output channel (red, green, blue and alpha) is added to the compositing buffer configured within RAM 170 in accordance with Equation (17) as follows:

$$\text{composite\_buffer}_{pixel,channel} = \text{composite\_buffer}_{pixel,channel} + \text{OBJ\_OUT\_COL}_{pixel,channel} \quad (17)$$

After step 1704, the method 1700 continues to step 1706, where the processor 105 performs the step of updating the primary mask values. Corresponding to each pixel, the primary mask values are updated in accordance with Equation (19) as follows:

$$\text{primary\_mask}_{pixel} = \text{primary\_mask}_{pixel} - \text{OBJ\_CONTRIB}_{pixel} \quad (19)$$

The updated primary mask values are a function of the contribution value (OBJ_CONTRIB) of the graphic object, in accordance with Equation (19). Furthermore, the contribution value (OBJ_CONTRIB) of the graphic object is a function of the opacity of the graphic object (OBLALPHA), in accordance with the Equation (14). Additionally, the existing primary mask values are a function of group opacity (G_ALPHA), in accordance with Equation (9). Accordingly, at step 1706, the primary mask values are updated using the group opacity (G_ALPHA) and the opacity (OBJ_ALPHA$_{pixel}$) corresponding to the graphic object. Following step 1706, the method 1700 is complete.

In an alternative embodiment, graphic objects may be composited without using a recursive technique. Instead of using recursion, information associated with a group may be stored in a stack data structure configured within the RAM 170. A method 1600 of compositing variable opacity graphic objects will now be described with reference to FIG. 16. One or more of the graphic objects are attenuated by group opacity. The method 1600 may be referred to as an "alternative compositing process". The method 1600 avoids recursion and may be implemented as one or more code modules of the application program 133 resident in ROM 160 and being controlled in its execution by the processor 105.

The method 1600 starts at 1602, where a number of initialisations are performed by the processor 105. In particular, at step 1602, a primary mask, or first mask, is initialised within RAM 170 such that all values of the primary mask have a value of two hundred and fifty five (255), the compositing buffer is initialised so that red, green, blue and alpha components are zero (0), and a current group (CUR_GROUP) is set to NULL. Accordingly, at step 1602 the processor 105 performs the step of initialising the primary mask. Additionally at step 1602, a next group (NEXT_GROUP) is set to the first rendering group in the groups list, the parent group of the next group is set to NULL, a MASK_ALL_ZERO flag is initialised to FALSE, and the current graphic object (CUR_OBJECT) is set to be the first graphic object in the active bitmap list.

The current group (CUR_GROUP) indicates the innermost group currently attenuating the current graphic object (CUR_OBJECT). The next group (NEXT_GROUP) indicates the next group in the groups list after the current group (CUR_GROUP) that needs to be processed during the compositing process 1400.

Following step 1602, the method 1600 continues to step 1604 where a test is performed by the processor 105 to determine whether the next group (NEXT_GROUP) starts at or above the current graphic object (CUR_OBJECT) where above is determined by Z order. If the next group does start at or above the current graphic object, then the method 1600 advances to step 1605. Otherwise, the method 1600 advances to step 1607. At step 1605, a reference to the primary mask is pushed on a stack for later use. The primary mask will be referred to as the stored mask.

Following step 1605, the method 1600 continues to step 1606 where a new mask is initialised according to the opacity of the next group. The new mask becomes the primary mask. The new mask will be a second mask when the step 1606 is executed a first time and a third mask when executed a second time and so on. The operations of initialising a new mask at step 1606 are summarised below:

allocate new_mask new_mask$_{pixel}$=stored_mask$_{pixel}$*(NEXT_GROUP.G_ALPHA)/255 primary_mask$_{pixel}$=new_mask$_{pixel}$

Still at step 1606, the current group (CUR_GROUP) is set to be the next group (NEXT_GROUP). Following step 1606, the next group (NEXT_GROUP) is set to be the group following the current group (CUR_GROUP.G_NEXT) in the groups list configured within RAM 170. Still at step 1606, if the NEXT_GROUP is not NULL, then the NEXT_GROUP.G_PARENT field is set to be the current group (CUR_GROUP). At steps 1605 and 1606, an optimisation may be performed to ignore groups that end above the current graphic object. Additionally, at steps 1605 and 1606, groups that have 100% group opacity may be ignored. Following step 1606, the method 1600 flows back to step 1604.

At step 1607 the current graphic object (CUR_OBJECT) is processed in accordance with the method 1700 described above with reference to FIG. 17. In particular, the current graphic object (CUR_OBJECT) is processed at step 1607 using the primary mask, which could be the first, second or any other mask that is currently in use by the method 1700.

Following step 1607 the method 1600 flows to step 1608 where the current graphic object (CUR_OBJECT) is tested to determine whether the current graphic object (CUR_OBJECT) is the bottom-most graphic object. If the current graphic object (CUR_OBJECT) is the bottom-most graphic object, then the method 1600 is complete. If the current graphic (CUR_OBJECT) object is not the bottom-most graphic object, then the method 1600 continues to step 1610.

At step 1610, the processor 105 sets the current graphic object (CUR_OBJECT) to be the next graphic object (CUR_

OBJECT.G_NEXT) in the active bitmap list configured within RAM 170. Following step 1610, the method 1600 continues to step 1611.

At step 1611*a* test is performed by the processor 105 to determine if the current group (CUR_GROUP) ends above, in terms of Z order, the current graphic object (CUR_OBJECT). If the current group (CUR_GROUP) does end above the current graphic object (CUR_OBJECT), then method 1600 continues to step 1612. Otherwise, the method 1600 loops back to step 1604.

At step 1612, the stored mask reference is popped from the stack. Still at step 1612, the stored mask referenced by the popped reference, is adjusted in a similar manner to step 1516 as described above. After adjustment, the primary mask is removed from RAM 170, and the adjusted stored mask is restored as the primary mask. These operations, performed at step 1612, are summarised below:

$$stored\_mask_{pixel} = primary\_mask_{pixel} + (255 - (CUR\_GROUP.G\_ALPHA)/255)*stored\_mask_{pixel};$$

free primary_mask;

$$primary\_mask_{pixel} = stored\_mask_{pixel};$$

Still at step 1612, the current group (CUR_GROUP) is set to be the parent group of the current group (CUR_GROUP.G_PARENT). Continuing, at the step 1612, the MASK_ALL_Z-ERO flag is updated according to the values of the primary mask. Following step 1612, the method 1600 flows to step 1611.

The methods described above will now be described by way of example with reference to FIGS. 19A, 19B, 19C, 19D, 19E, 19F, 19G and 19H. In the example, three graphic objects: a rectangle 1913, a triangle 1937 and a circle 1962 are composited in accordance with the method 1700, as shown in FIG. 19H. As seen in FIG. 19H, the rectangle 1913 is the top-most graphic object. The triangle 1937 is below the rectangle 1913. The circle 1962 is the bottom-most graphic object. The top two graphic objects (i.e., the rectangle 1913 and triangle 1937), are grouped together and a group opacity of 0.4 is applied to the grouped graphic objects. The grouped graphic objects comprising the rectangle 1913 and triangle 1937 will be referred to below as "the group".

Figure 19A:
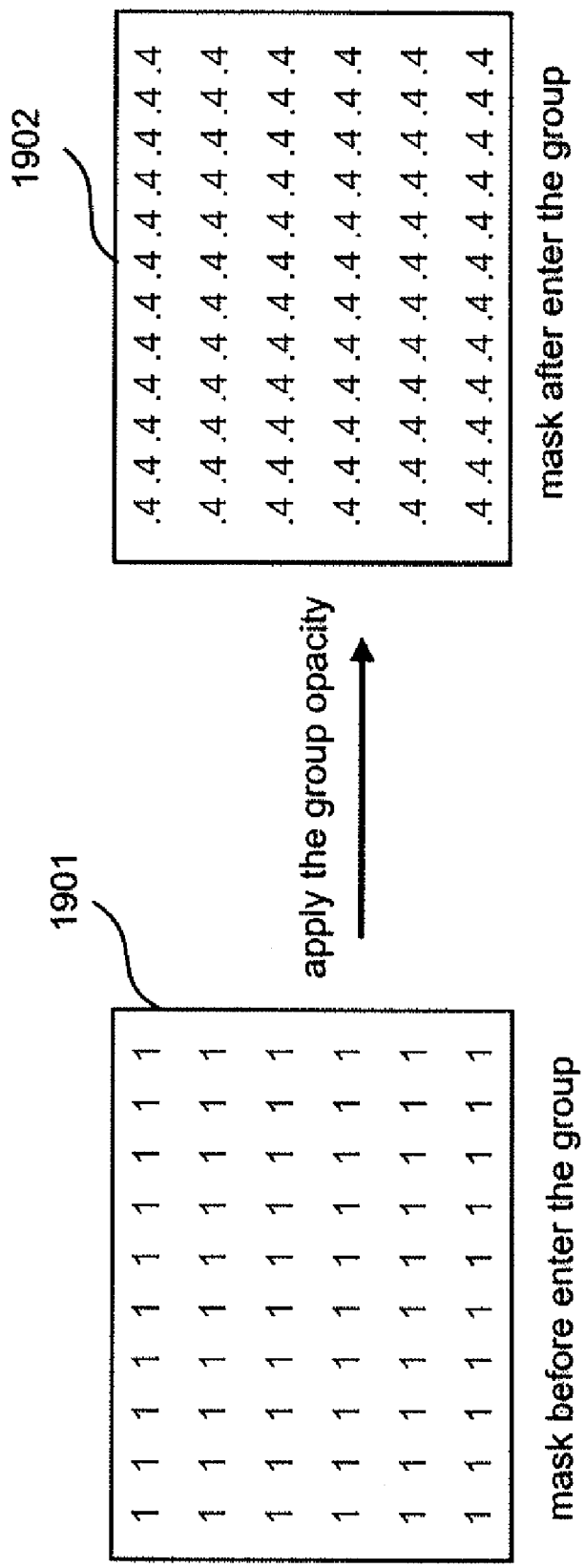
FIG. 19A shows a mask buffer before and after entering a group of graphic objects.

FIG. 19A shows a new mask 1902 generated after entering the group. Before entering the group, primary mask 1901 has values of one (1) (i.e., 100%) as shown in FIG. 19A. As previously described in steps 1503 and 1504 of method 1500, a new mask 1902 may be generated by multiplying the values of the primary mask (e.g., the mask 1901) with a group opacity which in the present example has a value of 0.4 (i.e., 40%). Accordingly, as seen in FIG. 19A, the new mask 1902 has values of 0.4. The primary mask 1901 may be stored in the RAM 170 for later use.

Figure 19B:
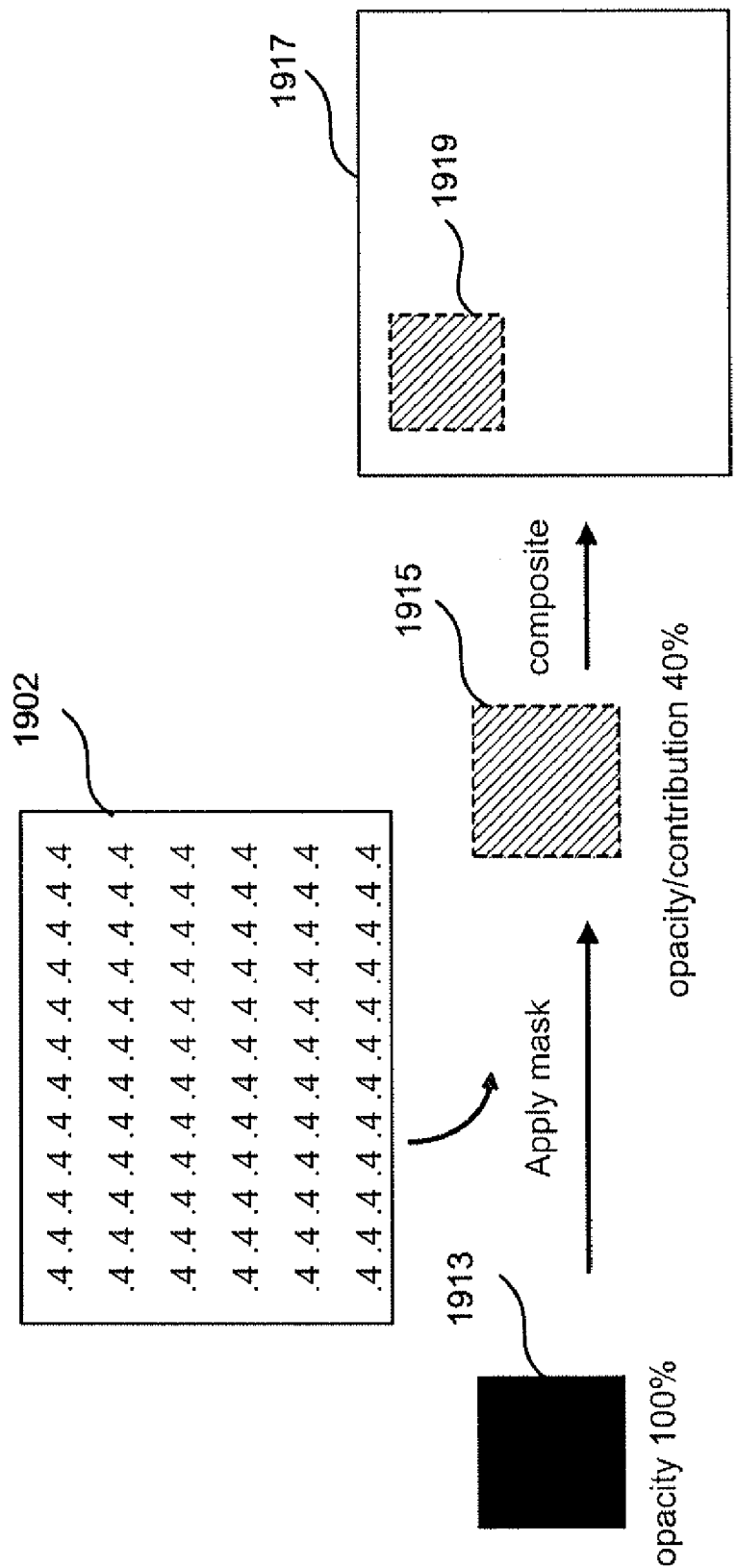
FIG. 19B shows a first graphic object composited using the mask buffer of FIG. 19A.

As shown in FIG. 19B, the mask 1902 may be used as a second primary mask to determine contribution values 1915 of the rectangle graphic object 1913 as at step 1702 of the method 1700. The contribution values 1915 of the rectangle graphic object 1913 are determined by multiplying the opacity of the rectangle graphic object 1913, which is one (1) (i.e., 100%), with the values of the mask 1902 comprising values of 0.4. The contribution values 1915 may then be used for compositing, as at steps 1703 and 1704 of method 1700, to determine a rectangle area 1919 having a final colour value. In the present example, the rectangle area 1919 is stored in composite buffer 1917 configured within RAM 170. The final output colour value of the rectangle area 1919 in the composite buffer 1917 is 40% of the original colour of the rectangle graphic object 1913.

Figure 19C:
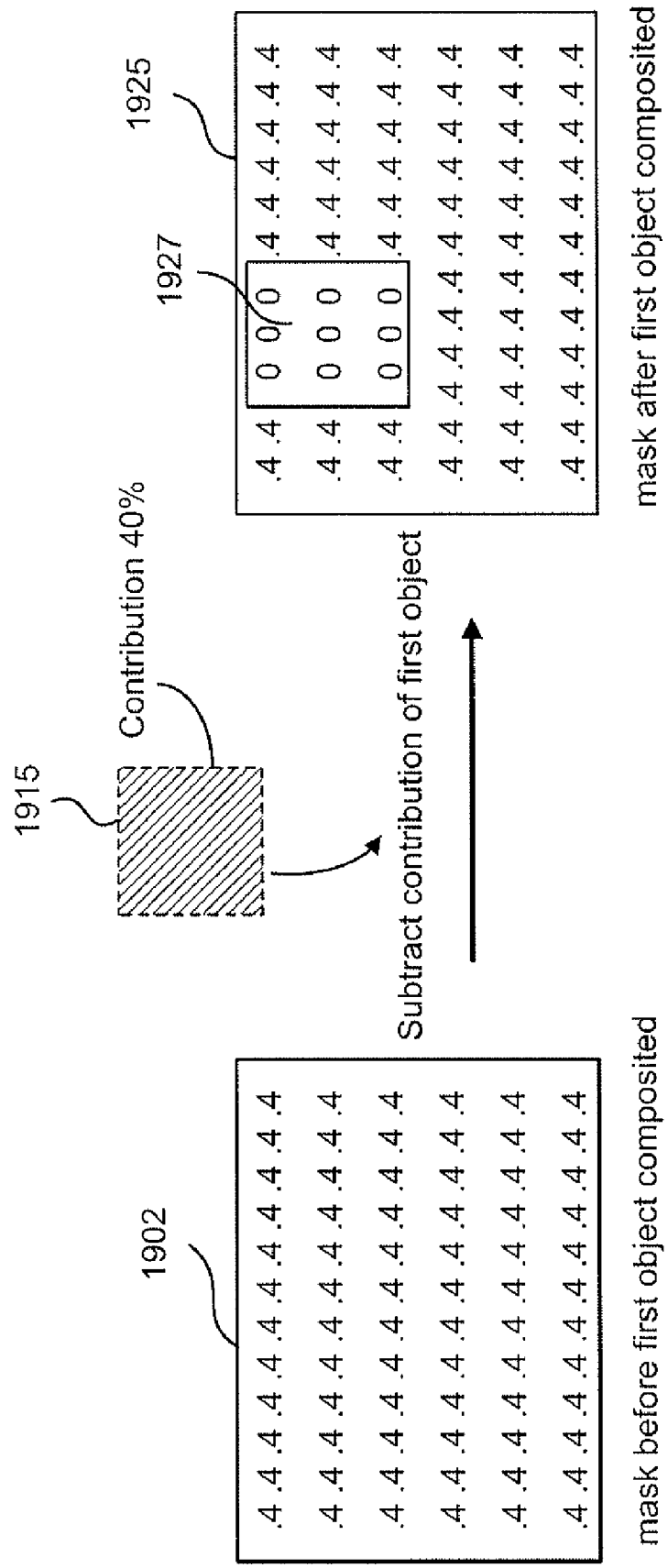
FIG. 19C shows an updated mask buffer formed from the mask buffer of FIG. 19A after the compositing of the first graphic object.

FIG. 19C shows an updated mask 1925 formed from the mask 1902 after compositing of the rectangle graphic object 1913, as at step 1706 of the method 1700. The contribution values 1915 are subtracted from corresponding values in the mask buffer 1902, resulting in zero (0) values in an area 1927 in the updated mask buffer 1925. The updated mask buffer 1925 may be stored in RAM 170. The area 1927 corresponds to the rectangle area 1919 in the composite buffer 1917.

Figure 19D:
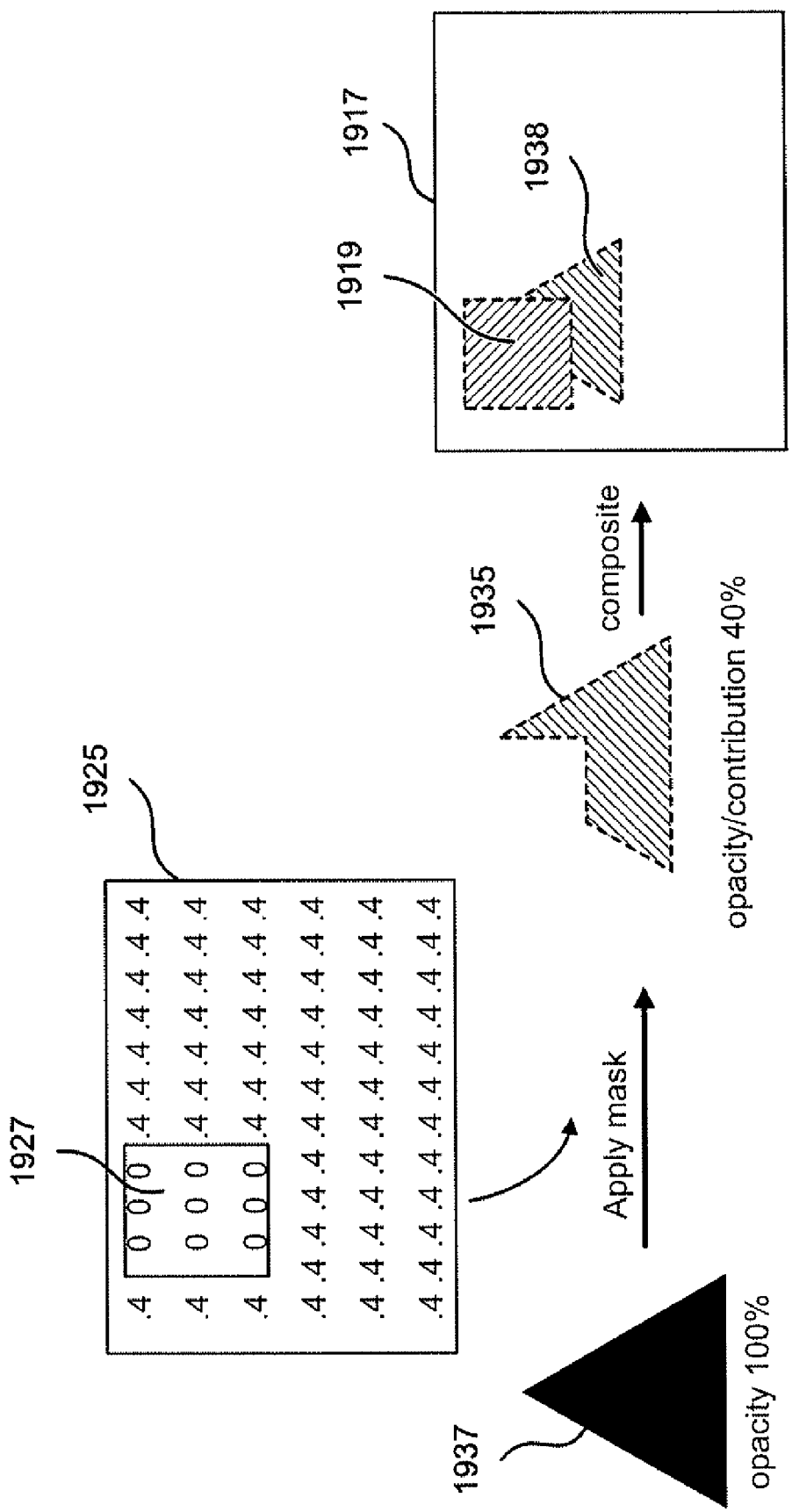
FIG. 19D shows a second graphic object composited using the mask buffer of FIG. 19C.

As shown in FIG. 19D, the updated mask 1925 may be used to determine contribution values 1935 of the triangle graphic object 1937, as at step 1702 of the method 1700. The contribution values 1935 of the triangle 1937 are determined by multiplying the opacity of the triangle graphic object 1937 (of value one (1) representing 100% opacity) with the values of the updated mask 1925. As shown in FIG. 19D, area 1927 in the updated mask buffer 1925 has values of zero (0), and part of the triangle graphic object 1937 intersects with the area 1927. The contribution of the part of the triangle graphic object 1937 that intersects with the area 1927 is zero (0) and the contribution 1935 of a remaining part of triangle graphic object 1937 is 0.4. In the example of FIG. 19D, the contribution values 1935 are used to perform compositing, as at steps 1703 and 1704 of method 1700, to determine an area 1938 having a final output colour value. The area 1938 is stored in composite buffer 1917 configured within RAM 170. The final output colour value of the area 1938 in the composite buffer 1917 is 40% of the original colour of the triangle 1937. The composite buffer 1917 contains the rectangle area 1919 that corresponds to the rectangle graphic object 1913 and the area 1938 that corresponds to part of the triangle graphic object 1937. The two areas 1919 and 1938 have a colour value that is 40% of the original colour value of the rectangle graphic object 1913 and the triangle graphic object 1937, respectively.

Figure 19E:
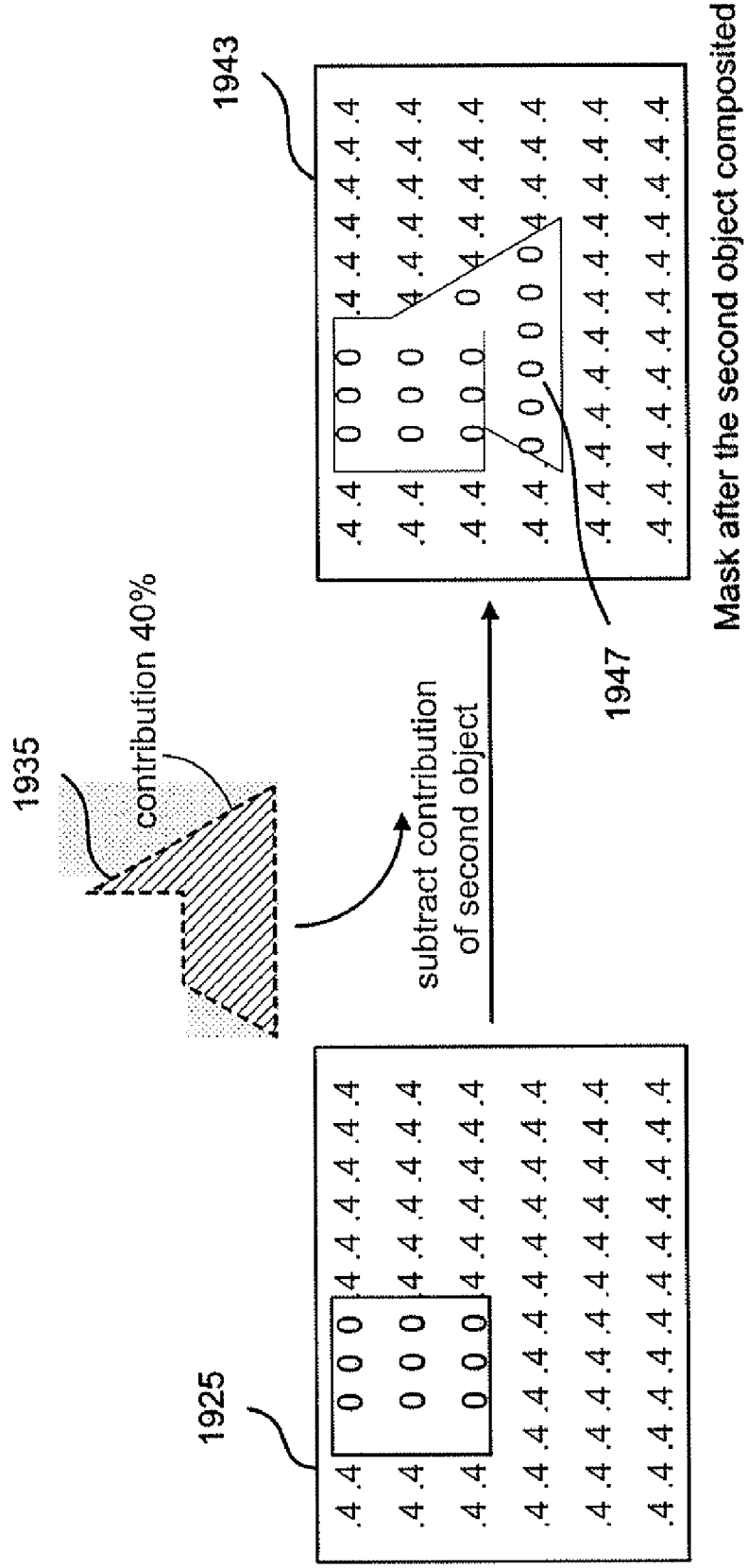
FIG. 19E shows an updated mask buffer formed from the mask buffer of FIG. 19C after compositing of the second graphic object in the group of graphic objects.

FIG. 19E shows an updated mask 1943 formed from the mask 1925 after compositing of the triangle 1937, as at step 1706 of the method 1700. The contribution values 1935 are subtracted from corresponding values in the mask buffer 1925, resulting in zero (0) values in area 1947 in the updated mask buffer 1943. The area 1947 corresponds to the rectangle 1919 and the triangle 1938 in the composite buffer 1917.

Figure 19F:
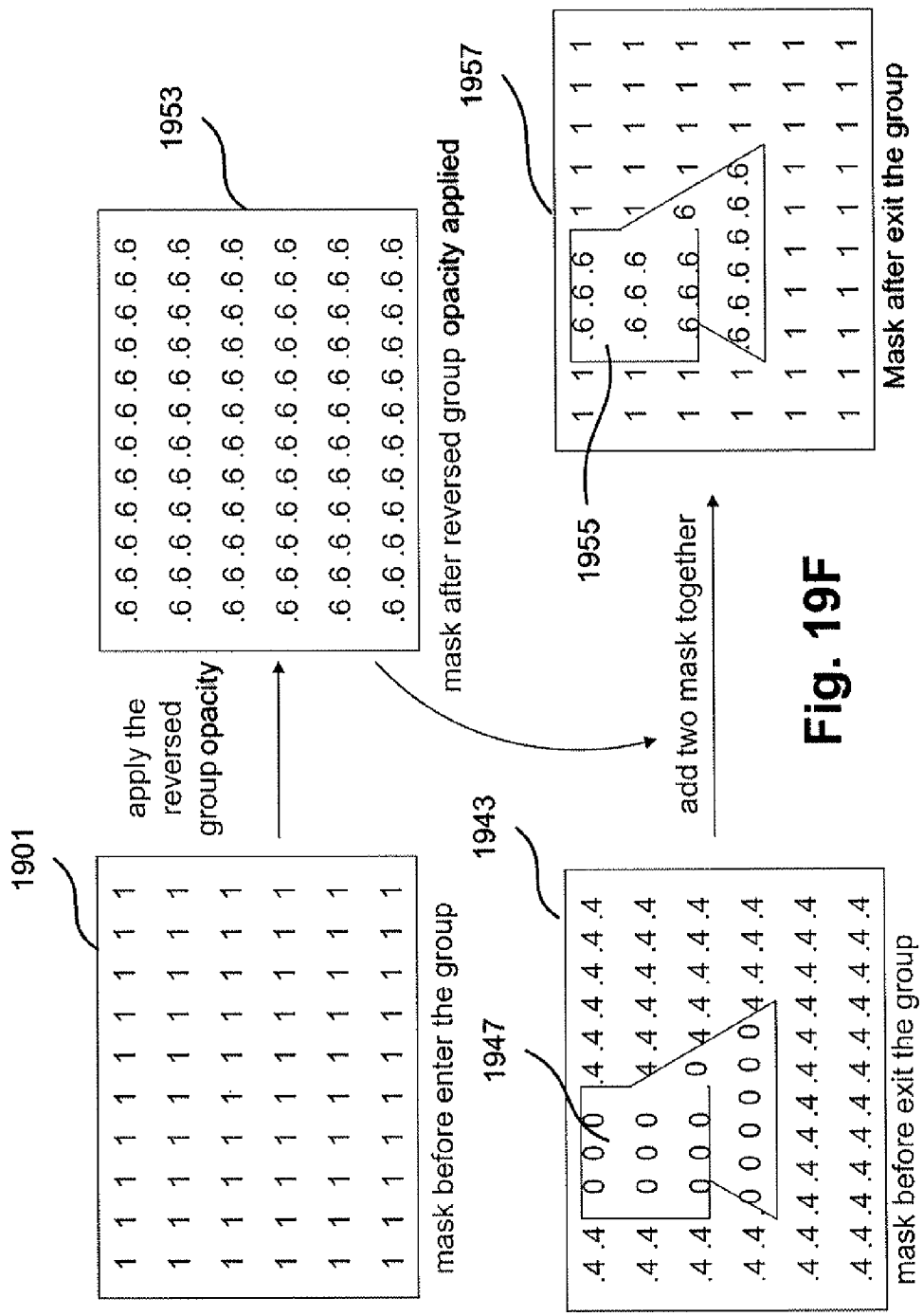
FIG. 19F shows an updated mask buffer formed from the mask buffer of FIG. 19A when leaving the group of graphic objects.

FIG. 19F shows an updated mask 1953 formed from the mask 1901 after processing the group. As previously described in step 1516 of method 1500, values of the mask 1901 may be multiplied by a reversed group opacity 0.6 (i.e., 1-0.4), resulting in the updated mask 1953 that has values of 0.6. The updated mask 1953 may be stored in RAM 170. The previously updated second mask 1943 is added to the updated stored mask 1953, resulting in a restored primary mask 1957. Area 1955 in the restored primary mask 1957 corresponds to the rectangle area 1919 and triangle area 1938 in the composite buffer 1917.

Figure 19G:
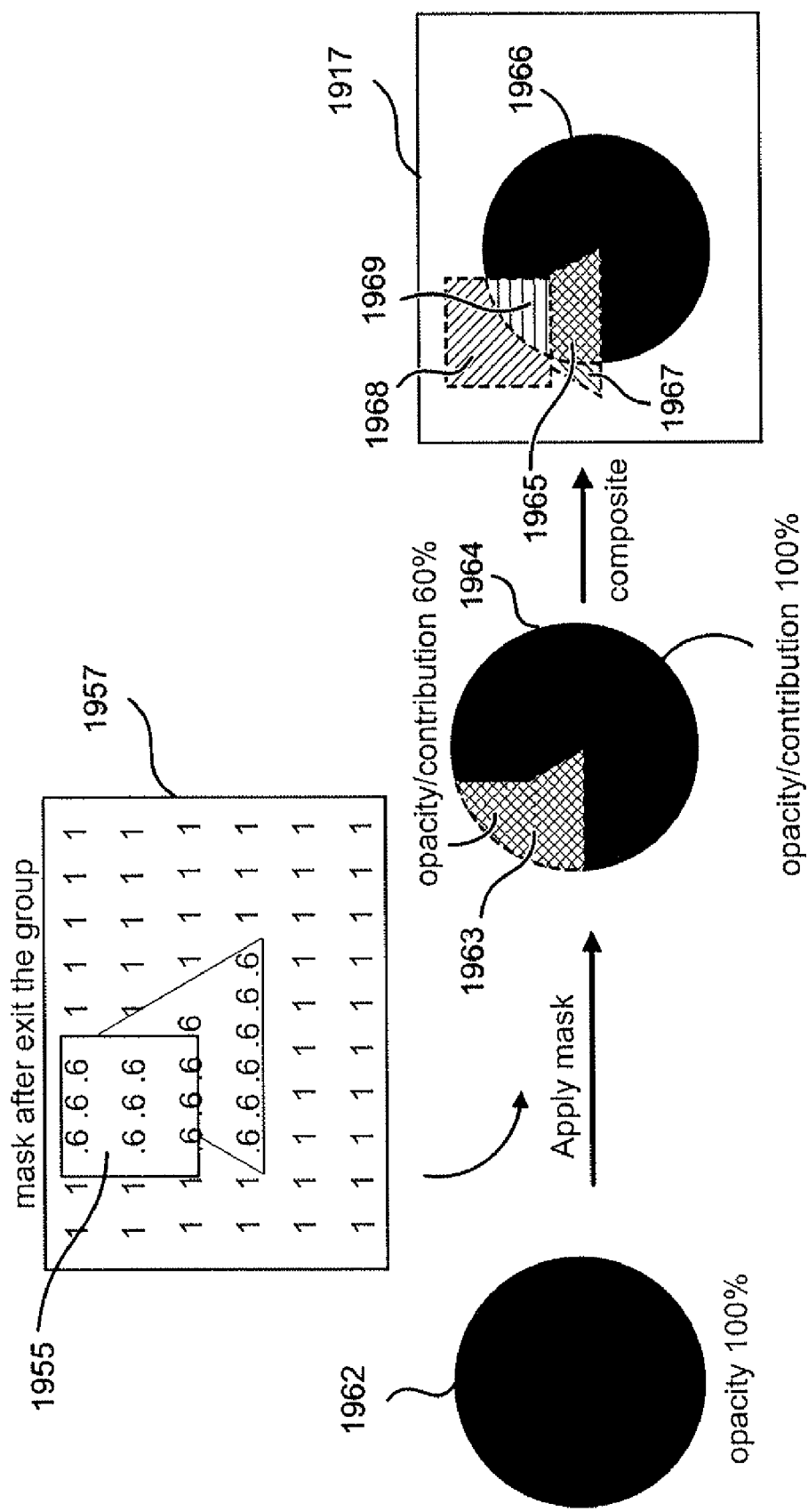
FIG. 19G illustrates the compositing process of the graphic object outside the group of graphic objects using the mask buffer.
Figure 19H:
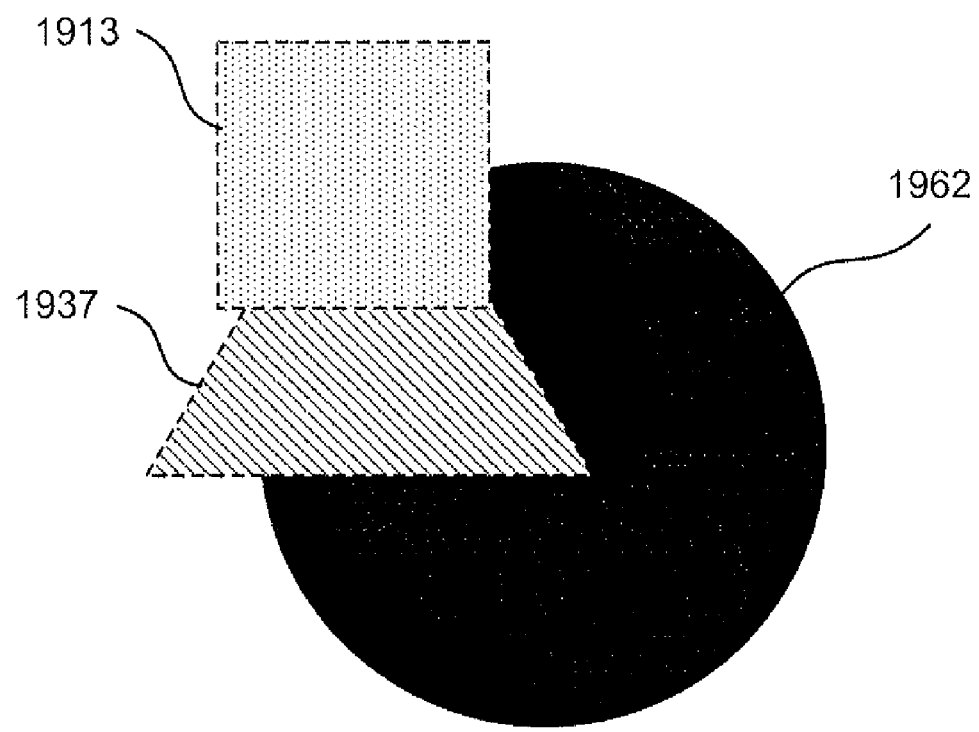
FIG. 19H shows three example graphic objects composited in accordance with the method of FIG. 17.

As shown in FIG. 19G, the restored primary mask 1957 may be used to determine contribution values 1963 and 1964 of the circle graphic object 1962, as at step 1702 of method 1700. The contribution values 1963 and 1964 of the circle graphic object 1962 may be determined by multiplying opacity of the circle graphic object 1962 (i.e. the value one (1), representing 100% opacity) with the values of the mask 1957. As shown in FIG. 19G, area 1955 in the mask buffer 1957 has the value 0.6, and part of the circle 1962 intersects the area 1955. The contribution values 1963 of the part of the circle 1962 that intersects the area 1955 are 0.6 and the contribution values 1964 of the remaining part of circle 1962 are one (1). The contribution values 1963 and 1964 may be used for compositing as described previously in steps 1703 and 1704 of method 1700. A final output colour value 1966 in the composite buffer 1917 is 100% of the original colour of the circle 1962. The composite buffer 1917 contains an area 1968 that corresponds to part of the rectangle graphic object 1913 and an area 1967 that corresponds to part of the triangle graphic object 1937. Both of the two areas 1968 and 1967 comprise colour values that are 40% of the original colour value of corresponding graphic objects. An area 1969 in composite buffer 1917 has a mixed colour from both rectangle graphic object 1913 and the circle graphic object 1962. In the area 1969, the colour value is a mix of 40% of the original colour value from rectangle graphic object 1913 and 60% of the original colour value from the circle graphic object 1962. An area 1965 in composite buffer 1917 has a mixed colour from both triangle graphic object 1937 and circle graphic object 1962. In the area 1965, the colour value is a mix of 40% of the original colour value from triangle graphic object 1937 and 60% of the original colour value from the circle graphic object 1962.

In one embodiment, an optimisation may be used to improve the efficiency of compositing constant alpha graphic objects. In such an embodiment, graphic objects above the top-most variable alpha graphic object may be processed using just a single mask value representing the entire run of pixels to be rendered. Such an optimisation may be used to process graphic objects that are above (i.e. of higher priority than) the top-most variable alpha graphic object. Instead of initialising the mask buffer at the size of the number of pixels involved in compositing (COMP_WIDTH), only a single mask value is initialised. When a graphic object with variable alpha is encountered, a mask buffer with size equal to the run length (COMP_WIDTH) may be initialised so that all mask values are equal to the single mask value. Following the initialisation of the mask buffer, the methods described above may be used to composite variable opacity objects with group opacity applied.

Following the steps of the method 1400 (compositing process) or the method 1600 (alternative compositing process), the result pixels for the run are read from the compositing buffer, converted into the frame buffer pixel format and written to the frame buffer configured within RAM 170.

As described above, there are numerous pixel formats that can be used for representing a bitmap image. In one embodiment, the frame buffer contains pixels of the RGBA8888 pixel format which can be assembled from individual 8 bit red, green, blue and opacity channels. In this instance, the opacity information is stored as part of each frame buffer pixel. The opacity information is only necessary in some applications. If opacity information is not required in the frame buffer then the opacity information may be omitted from the frame buffer as an optimisation.

In one embodiment, the compositing buffer may be used as the frame buffer, and no separate frame buffer is required. In such an embodiment, no conversion of pixel format takes place since the pixels of the compositing buffer are in a pixel format that is suitable for display on display device 114.

A dithering operation may be applied to each frame buffer pixel. Display devices using a low number of bits per colour channel can exhibit unintended patterns that degrade the visual quality of the rendered output image. Such unintended patterns are a result of the low dynamic range of phosphor intensities to which such displays are limited. Dithering is used to minimise such unwanted effects.

In one embodiment, the rendering system outputs eight (8) bits per channel data. In this instance, dithering is not performed since eight (8) bits per channel data provides sufficient dynamic range of phosphor intensities.

After all pixel runs in the frame have been composited and written to the frame buffer, the frame buffer will be in a state suitable for display on the display device 114.

In one embodiment, the processor 105 executes a method of creating a linear gradient filled bitmap image. After creating a linear gradient filled bitmap image, the bitmap image may be used as input to for compositing with other bitmap images.

Figure 18:
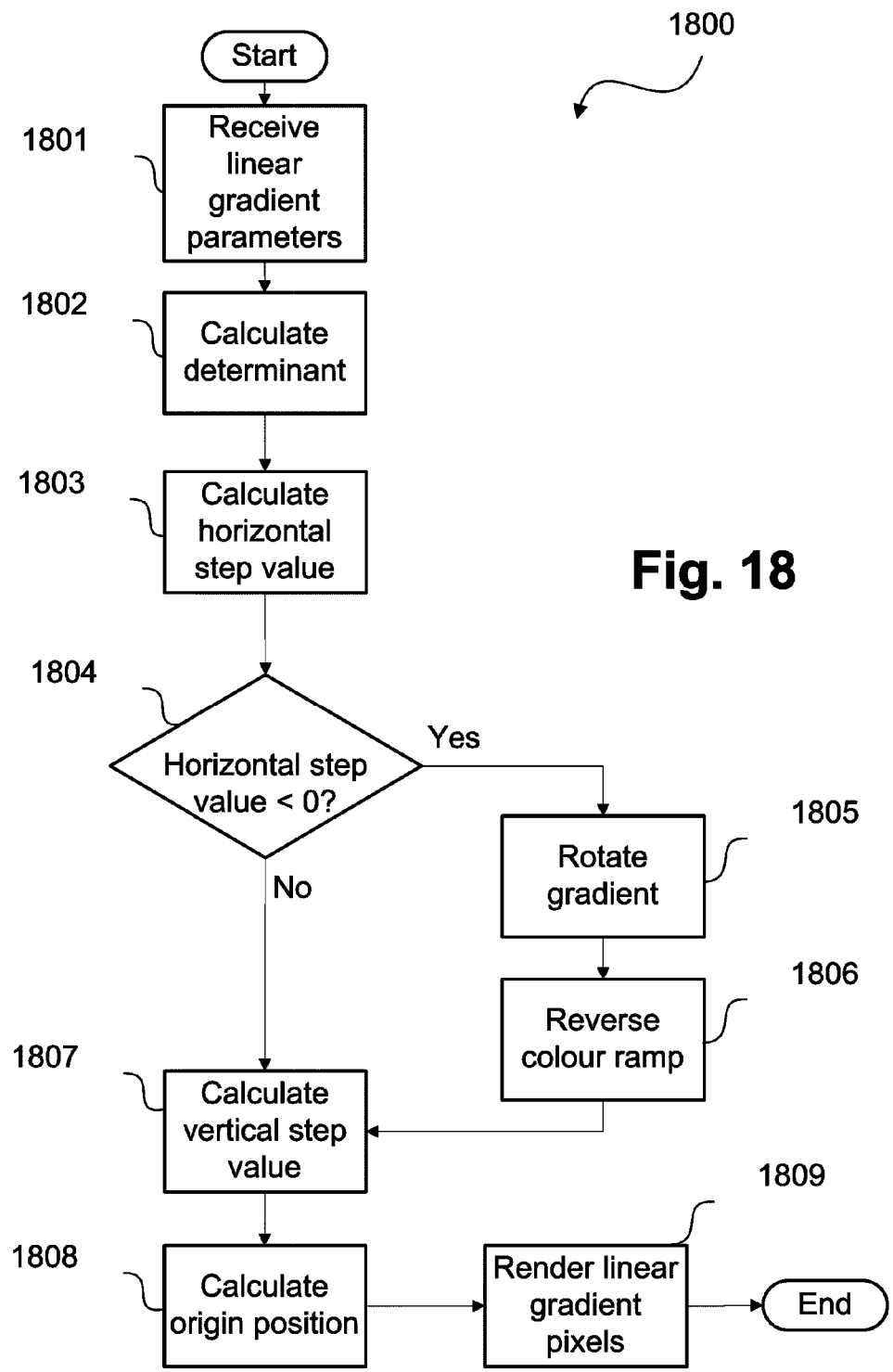
FIG. 18 is a flow diagram showing a method of filling a bitmap image with a linear gradient fill.

A method 1800 of filling a bitmap image with a linear gradient, will now be described with reference to FIG. 18. The method 1800 may be implemented as one or more code modules of the application program 133 resident in ROM 160 and being controlled in its execution by the processor 105.

The method 1800 begins at step 1801, where the processor 105 determines parameters of the linear gradient. The linear gradient parameters are as follows:

a colour ramp array (RAMP) consisting of nine (9) RGBA8888 colour values (RAMP[0], RAMP[1], RAMP[2], RAMP[3], RAMP[4], RAMP[5], RAMP[6], RAMP[7] and RAMP[8]);

an affine transformation matrix that may position, scale and rotate the linear gradient into the bitmap image (TXFM);

bitmap image buffer (B_BUF);

stride value for the image (B_STRIDE);

width of the bitmap image (B_W); and height of the bitmap image (B_H).

The linear gradient to fill the bitmap image consists of nine (9) ordered RGBA colour values. Each of these nine (9) colours are specified in a colour ramp parameter (RAMP). The colour ramp is an array of unsigned thirty two (32) bit values, where each unsigned thirty two (32) bit value represents one RGBA8888 colour value.

A linear gradient may be defined to exist in a two dimensional (2D) gradient space. In the gradient space, the linear gradient blends colours of the colour ramp across a range from $x=0$ to $x=65536$. The gradient space range $x<0$ will be filled using a first colour ramp colour (RAMP[0]). The gradient space range $x>65536$ will be filled using a last colour ramp value (RAMP[8]).

A transformation (TXFM parameter) may be specified for mapping the linear gradient from gradient space into the bitmap image space. The transformation supplied is an affine transformation as is commonly used in the field of two dimensional (2D) computer graphics. The transformation parameter (TXFM) may be determined in accordance with Equation (20) below:

$$TXFM = \begin{bmatrix} sx & r1 & tx \\ r0 & sy & ty \\ 0 & 0 & 1 \end{bmatrix} \quad (20)$$

The TXFM parameter may be used to scale, rotate and translate the linear gradient by transforming the gradient space into the bitmap image space. If an identity transform (i.e. one that does not scale, rotate or translate) is supplied as the TXFM parameter, then the linear gradient will be rendered so that the 9 colours of the colour ramp (RAMP) are blended between the range $x=0$ to $x=65536$.

Following step 1801, the method 1800 continues to step 1802 where the processor 105 determines a determinant value of the transformation parameter (TXFM). The determinant value is calculated in accordance with Equation (21) as follows:

$$\text{Determinant} = sx*sy - r1*r0 \quad (21)$$

After step 1802, the method 1800 continues to step 1803 wherein a horizontal step value is calculated in accordance with Equation (22) as follows:

Horizontal_Step_Value=$sy$/Determinant    (22)

After step 1803, the method 1800 continues to step 1804, where the processor 105 determines whether the horizontal step value is less than zero. If the horizontal step value is less than zero (0), then the method 1800 continues to step 1805. Otherwise, the method 1800 continues to step 1807.

At step 1805, the processor 105 updates TXFM to include a one hundred and eighty (180) degree rotation about the centre of the linear gradient and the horizontal step value is set to the negative of the horizontal step value.

The rotation of the linear gradient at step 1805 is achieved using a matrix multiplication in accordance with Equation (23) as follows:

$$TXFM = TXFM \cdot \begin{bmatrix} -1 & 0 & 65536 \\ 0 & -1 & 65536 \\ 0 & 0 & 1 \end{bmatrix} \quad (23)$$

Following step 1805, the method 1800 continues to step 1806 which involves reversing the colours of the colour ramp (RAMP). The colour ramp is reversed by swapping the colour value RAMP[0] with the colour value RAMP[8], the colour value RAMP[1] with the colour value RAMP[7], the colour value RAMP[2] with the colour value RAMP[6] and the colour value RAMP[3] with the colour value RAMP[5].

Following step 1806, the method 1800 continues to step 1807. At step 1807, a vertical step value may be determined by the processor 105 in accordance with Equation (24) as follows:

Vertical_Step_Value=−$r1$/Determinant    (24)

After step 1807, the method 1800 continues to step 1808 where the gradient space position corresponding to the bitmap image origin is determined by the processor 105. The gradient space position is the start point when rendering the linear gradient to the bitmap image. The gradient space bitmap image origin value may be determined in accordance with Equation (25) as follows:

Gradient_Space_Bitmap_Origin=($r1*ty-tx*sy$)/Determinant    (25)

After step 1808, the method 1800 continues to step 1809 where linear gradient pixels are rendered by the processor 105 to a bitmap image buffer (B_BUF) configured within RAM 170. The linear gradient pixel rendering is performed one scan line at a time until all scan lines for the bitmap image are finished. For each pixel in each scan line of the bitmap image, a gradient space position (gx) is determined from the bitmap image space pixel position (x, y) according to the following equation:

$gx$=Gradient_Space_Bitmap_Origin+
   $y$*Vertical_Step_Value+
   $x$*Horizontal_Step_Value (26)

Following determination of the gradient space position (gx), a final pixel colour value is determined as follows:
If gx<0, the colour is RAMP[0].
If gx>65535, the colour is RAMP[8].
For gx in the range 0 to 65535, the colour is
   RAMP[gx/8192]*(1.0−mod(x, 8192)/8192)
   +
   RAMP[(gx/8192)+1]*(mod(x, 8192)/8192)

After step 1809, the method 1800 of filling a bitmap image with a linear gradient is complete.

The methods described above perform alpha compositing of graphic objects attenuated by group opacity very efficiently. The described methods need less memory than conventional compositing methods since no additional RGBA image buffer is needed. In accordance with the methods described above, a single mask is used for each nested group. The mask is 25% of the size of such a RGBA image buffer.

The compositing methods described above support nested groups and only visible graphic objects are rendered. For example, if graphic object A is obstructed, then the graphic object A will not be rendered. Accordingly, there is no need to access obstructed graphic objects below a current graphic object in accordance with the described methods.

In accordance with the methods described above, there is no per graphic object overhead to support group opacity. Further the scan ordered frame buffer only needs to be written once for each graphic object.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of compositing a plurality of graphic objects with a compositing buffer, said plurality of graphic objects forming a group being attenuated by group opacity and being composited from a top object to a bottom object, the method comprising the steps of:
   generating, based on a first mask and the group opacity, a second mask, the first mask storing a remaining possible contribution for further graphic objects below and including said plurality of graphic objects;
   processing said plurality of graphic objects in a top down order, the processing comprising the sub-steps of, for each graphic object of the plurality of graphic objects:
   (a) determining a contribution value for the graphic object using the second mask, the contribution value representing a contribution of the graphic object to the compositing buffer;
   (b) compositing a colour value of the graphic object with the compositing buffer using said contribution value; and
   (c) updating the second mask using said contribution value; and
   updating the first mask using said second mask and the group opacity, wherein said updated first mask is configured for further compositing of objects below said plurality of graphic objects.

2. The method according to claim 1 wherein the first and second masks are each a single channel mask representing red, green, blue or alpha.

3. The method according to claim 1, wherein the compositing is an OVER operation.

4. The method of claim 1, wherein the colour value includes an opacity value.

5. The method of claim 1, wherein said group opacity is a function of screen position.

6. The method of claim 1, wherein said group opacity is a function of screen row.

7. The method of claim 1, wherein said group opacity is configured for clipping at least part of the graphic object.

8. An apparatus for compositing a plurality of graphic objects with a compositing buffer, said plurality of graphic objects forming a group being attenuated by group opacity and being composited from a top object to a bottom object, the apparatus comprising:
   means for generating, based on a first mask and the group opacity, a second mask, the first mask storing a remaining possible contribution for further graphic objects below and including said plurality of graphic objects;
   means for processing said plurality of graphic objects in a top down order, the processing comprising the steps of, for each graphic object of the plurality of graphic objects:
      (a) determining a contribution value for the graphic object using the second mask, the contribution value representing a contribution of the graphic object to the compositing buffer;
      (b) compositing a colour value of the graphic object with the compositing buffer using said contribution value; and
      (c) updating the second mask using said contribution value; and
   means for updating the first mask using said second mask and the group opacity, wherein said updated first mask is configured for further compositing of objects below said plurality of graphic objects.

9. A system for compositing a plurality of graphic objects with a compositing buffer, said plurality of graphic objects forming a group being attenuated by group opacity and being composited from a top object to a bottom object, the system comprising:
   a memory for storing data and a computer program; and
   a processor coupled to said memory for executing said computer program, said computer program comprising instructions for:
      generating, based on a first mask and the group opacity, a second mask, the first mask storing a remaining possible contribution for further graphic objects below and including said plurality of graphic objects;
      processing said plurality of graphic objects in a top down order, the processing comprising the sub-steps of, for each graphic object of the plurality of graphic objects:
         (a) determining a contribution value for the graphic object using the second mask, the contribution value representing a contribution of the graphic object to the compositing buffer;
         (b) compositing a colour value of the graphic object with the compositing buffer using said contribution value; and
         (c) updating the second mask using said contribution value; and
      updating the first mask using said second mask and the group opacity, wherein said updated first mask is configured for further compositing of objects below said plurality of graphic objects.

10. A non-transitory computer readable medium having recorded thereon a computer program for compositing a plurality of graphic objects with a compositing buffer, said plurality of graphic objects forming a group being attenuated by group opacity and being composited from a top object to a bottom object, the program comprising: code for generating, based on a first mask and the group opacity, a second mask, the first mask storing a remaining possible contribution for further graphic objects below and including said plurality of graphic objects; code for processing said plurality of graphic objects in a top down order, the processing comprising the steps of, for each graphic object of the plurality of graphic objects: (a) determining a contribution value for the graphic object using the second mask, the contribution value representing a contribution of the graphic object to the compositing buffer; (b) compositing a colour value of the graphic object with the compositing buffer using said contribution value; and (c) updating the second mask using said contribution value; and code for updating the first mask using said second mask and the group opacity, wherein said updated first mask is configured for further compositing of objects below said plurality of graphic objects.

* * * * *